United States Patent
Pan et al.

(10) Patent No.: US 11,071,006 B1
(45) Date of Patent: Jul. 20, 2021

(54) METHOD AND APPARATUS FOR REQUESTING SIDELINK TRANSMISSION RESOURCES IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/119,486

(22) Filed: Dec. 11, 2020

Related U.S. Application Data

(60) Provisional application No. 62/958,061, filed on Jan. 7, 2020.

(51) Int. Cl.
  *H04W 28/02* (2009.01)
  *H04W 72/08* (2009.01)
  *H04W 76/27* (2018.01)

(52) U.S. Cl.
  CPC ..... *H04W 28/0268* (2013.01); *H04W 72/087* (2013.01); *H04W 76/27* (2018.02)

(58) Field of Classification Search
  CPC ................ H04W 28/0268; H04W 72/087; H04W 76/27
  See application file for complete search history.

(56) References Cited

U.S. PATENT DOCUMENTS

| 2016/0192232 A1* | 6/2016 | Sachdev | H04L 41/5051 370/259 |
| 2020/0245113 A1* | 7/2020 | Kang | H04W 76/27 |

FOREIGN PATENT DOCUMENTS

| CN | 110831075 | 2/2020 |

* cited by examiner

*Primary Examiner* — Rhonda L Murphy
(74) *Attorney, Agent, or Firm* — Skaar Ulbrich Macari, P.A.

(57) ABSTRACT

A method and apparatus are disclosed from the perspective of a first User Equipment (UE) to request dedicated sidelink configuration. In one embodiment, the method includes the first UE transmitting a first Radio Resource Control (RRC) message to a network node, wherein the first RRC message includes a sidelink Quality of Service (QoS) information, and wherein a presence of an identity of a sidelink QoS flow in the sidelink QoS information is mandatory and a presence of a QoS profile of the sidelink QoS flow in the sidelink QoS information is optional. The method also includes the first UE receiving a second RRC message from the network node, wherein the second RRC message includes a dedicated sidelink configuration and the identity of the sidelink QoS flow associated with the dedicated sidelink configuration.

17 Claims, 13 Drawing Sheets

US 11,071,006 B1

METHOD AND APPARATUS FOR REQUESTING SIDELINK TRANSMISSION RESOURCES IN A WIRELESS COMMUNICATION SYSTEM

CROSS-REFERENCE TO RELATED APPLICATIONS

The present Application claims the benefit of U.S. Provisional Patent Application Ser. No. 62/958,061 filed on Jan. 7, 2020, the entire disclosure of which is incorporated herein in its entirety by reference.

FIELD

This disclosure generally relates to wireless communication networks, and more particularly, to a method and apparatus for requesting sidelink transmission resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first User Equipment (UE) to request dedicated sidelink configuration. In one embodiment, the method includes the first UE transmitting a first Radio Resource Control (RRC) message to a network node, wherein the first RRC message includes a sidelink Quality of Service (QoS) information, and wherein a presence of an identity of a sidelink QoS flow in the sidelink QoS information is mandatory and a presence of a QoS profile of the sidelink QoS flow in the sidelink QoS information is optional. The method also includes the first UE receiving a second RRC message from the network node, wherein the second RRC message includes a dedicated sidelink configuration and the identity of the sidelink QoS flow associated with the dedicated sidelink configuration.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V16.0.0, "Architecture enhancements for 5G System (5GS) to support Vehicle-to-Everything (V2X) services (Release 16)"; TR 38.885 V16.0.0, "NR; Study on NR Vehicle-to-Everything (V2X) (Release 16)"; R2-1908107, "Report from session on LTE V2X and NR V2X"; R2-1916288, "Report from session on LTE V2X and NR V2X"; 3GPP email discussion [108#44][V2X] 38.331 running CR (Huawei), draft_R2-191xxx_Running CR to TS 38.331 for 5G V2X with NR Sidelink_v1; TS 38.322 V15.1.0, "NR; Radio Link Control (RLC) protocol specification (Release 15)"; and TS 38.323 V15.2.0, "NR; Packet Data Convergence Protocol (PDCP) protocol specification (Release 15)". The standards and documents listed above are hereby expressly incorporated by reference in their entirety.

Figure 1:
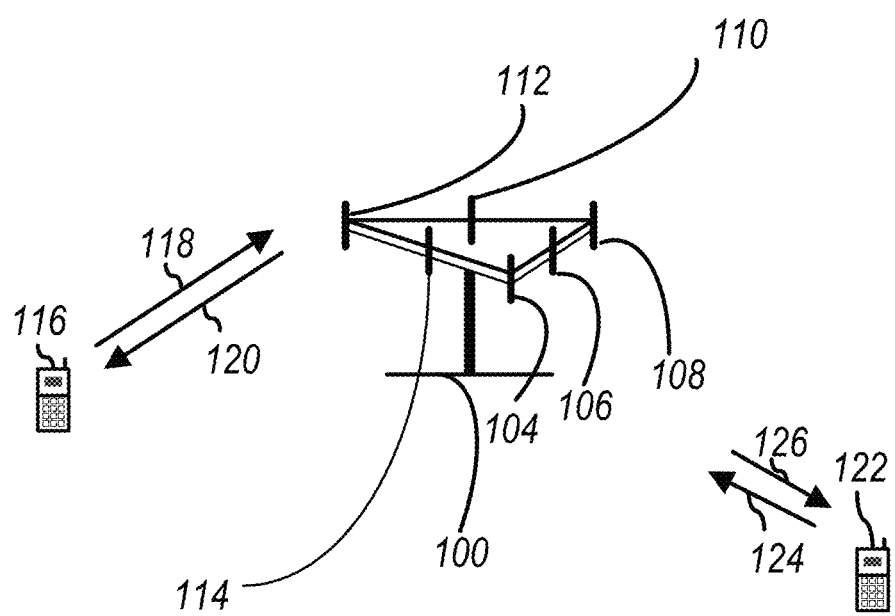
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
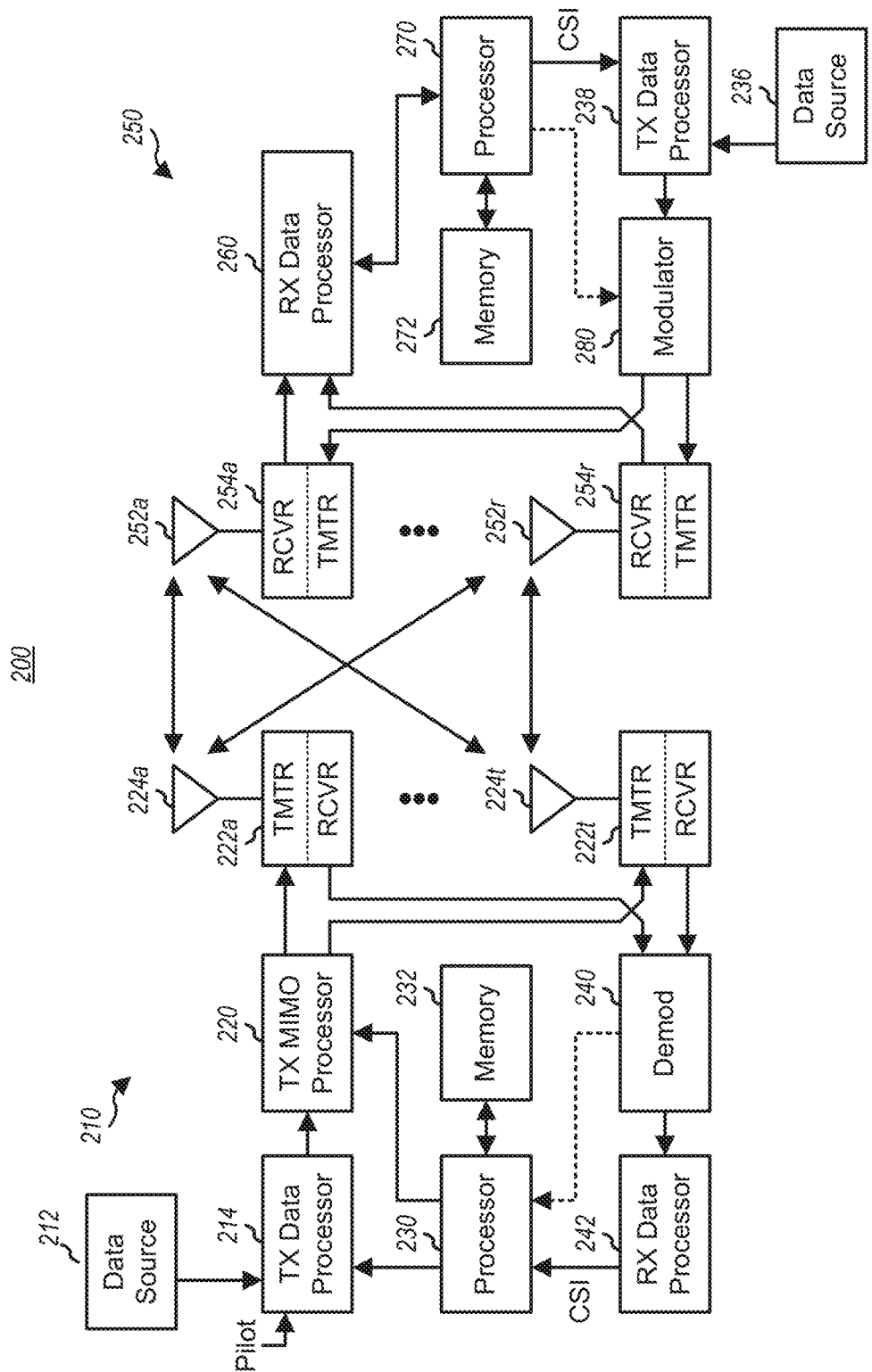
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
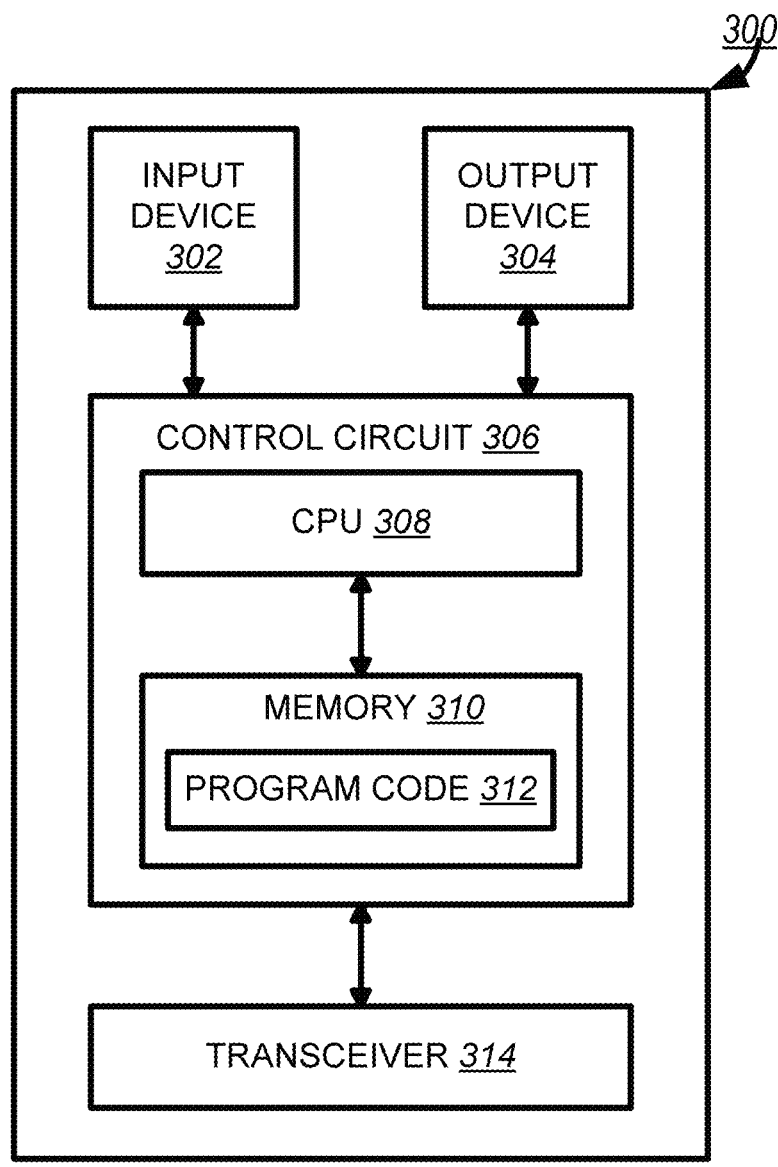
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
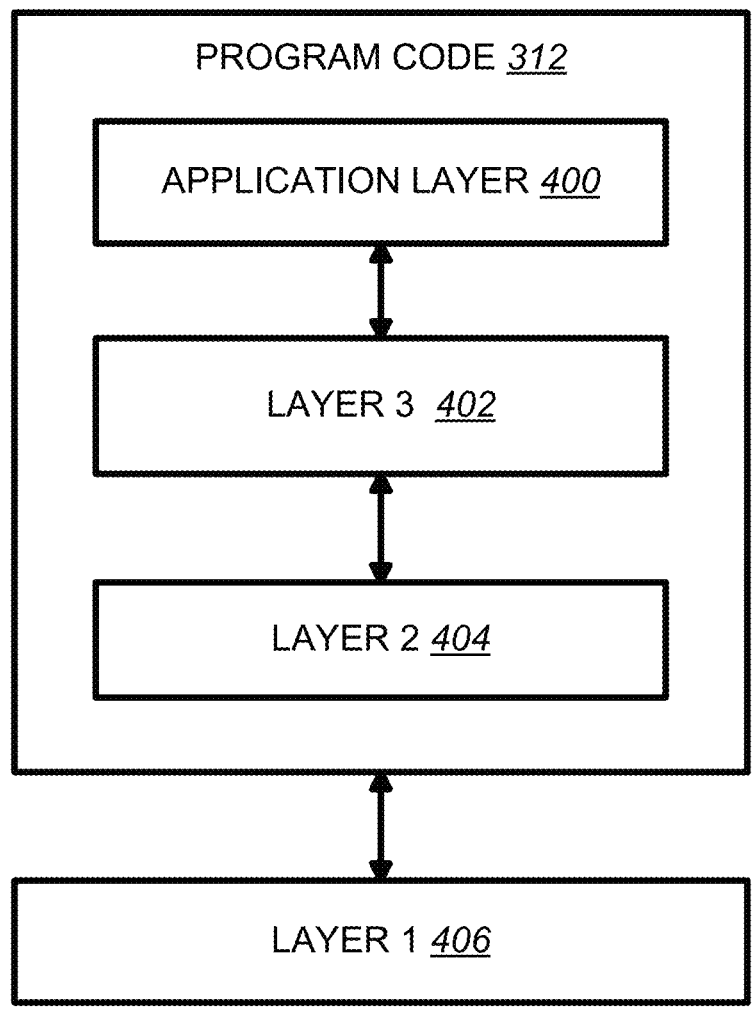
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies V2X (Vehicle-to-Everything) communication related to unicast mode as follows:

5.2.1.4 Unicast Mode Communication Over PC5 Reference Point

Figure 5:
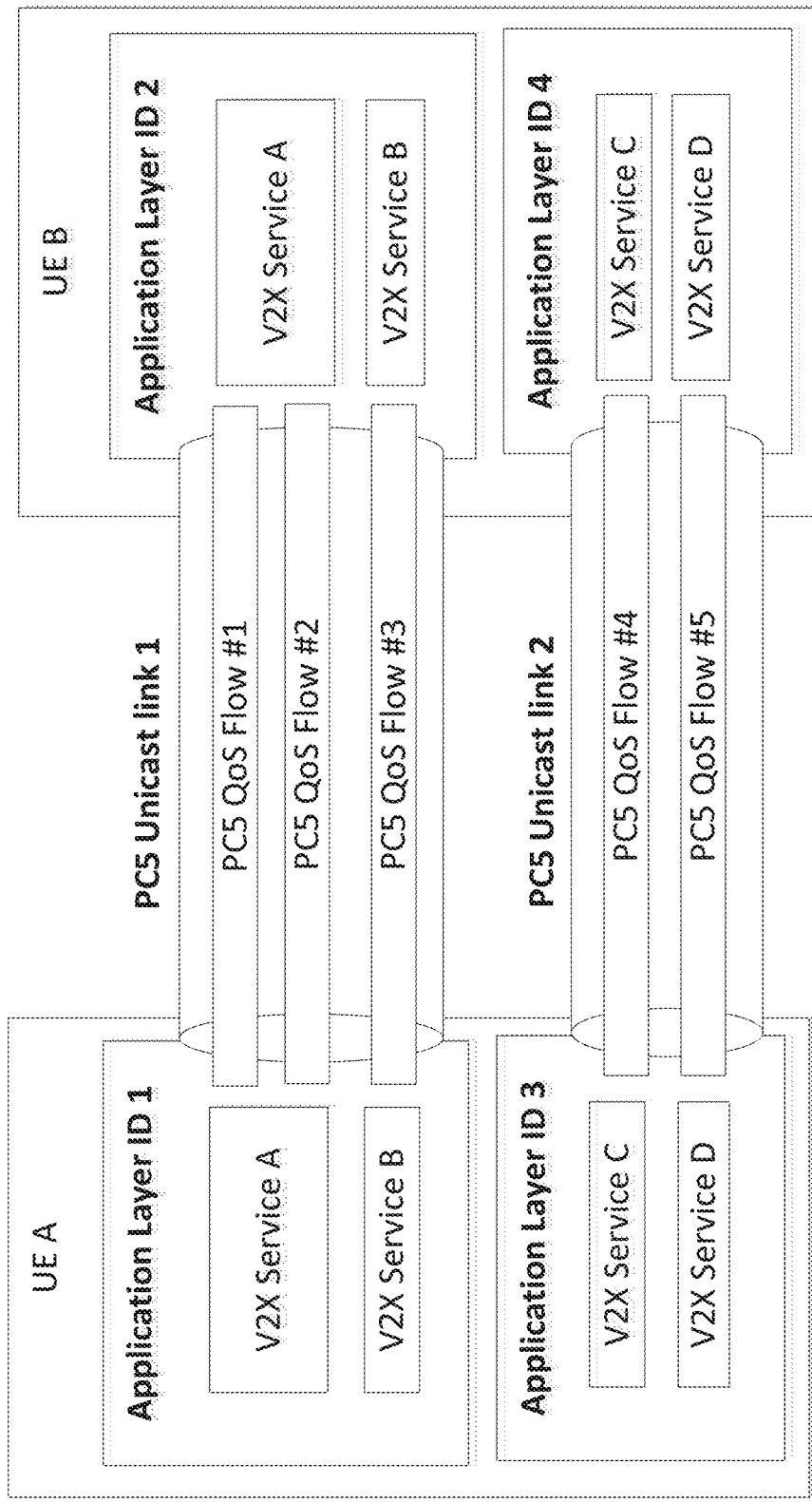
FIG. 5 is a reproduction of Figure 5.2.1.4-1 of 3GPP TS 23.287 V16.0.0.

Unicast mode of communication is only supported over NR based PC5 reference point. Figure 5.2.1.4-1 illustrates an example of PC5 unicast links.

[Figure 5.2.1.4-1 of 3GPP TS 23.287 V16.0.0, entitled "Example of PC5 Unicast Links", is reproduced as FIG. 5]

The following principles apply when the V2X communication is carried over PC5 unicast link:

A PC5 unicast link between two UEs allows V2X communication between one or more pairs of peer V2X services in these UEs. All V2X services in the UE using the same PC5 unicast link use the same Application Layer ID.

NOTE 1: An Application Layer ID may change in time as described in clauses 5.6.1.1 and 6.3.3.2, due to privacy. This does not cause a re-establishment of a PC5 unicast link.

One PC5 unicast link supports one or more V2X services (e.g. PSIDs or ITS-AIDS) if these V2X services are at least associated with the pair of peer Application Layer IDs for this PC5 unicast link. For example, as illustrated in Figure 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.

NOTE 2: A source UE is not required to know whether different target Application Layer IDs over different PC5 unicast links belong to the same target UE.

A PC5 unicast link supports V2X communication using a single network layer protocol e.g. IP or non-IP.

A PC5 unicast link supports per-flow QoS model as specified in clause 5.4.1.

When the Application layer in the UE initiates data transfer for a V2X service which requires unicast mode of communication over PC5 reference point:

the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

service type(s) (e.g. PSID or ITS-AID), Application Layer ID and Layer-2 ID of UE A; and Application Layer ID and Layer-2 ID of UE B; and network layer protocol used on the PC5 unicast link; and for each V2X service, a set of PC5 QoS Flow Identifier(s) (PFI(s)). Each PFI is associated with QoS parameters (i.e. PQI and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

[ . . . ]

5.6 Identifiers 5.6.1 Identifiers for V2X Communication Over PC5 Reference Point 5.6.1.1 General Each UE has one or more Layer-2 IDs for V2X communication over PC5 reference point, consisting of:

Source Layer-2 ID(s); and

Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames. The selection of the source and destination Layer-2 ID(s) by a UE depends on the communication mode of V2X communication over PC5 reference point for this layer-2 link, as described in clauses 5.6.1.2, 5.6.1.3, and 5.6.1.4. The source Layer-2 IDs may differ between different communication modes.

When IP-based V2X communication is supported, the UE configures a link local IPv6 address to be used as the source IP address, as defined in clause 4.5.3 of TS 23.303 [17]. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration described in clause 5.1.2.1, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g. when the Application Layer ID changes, the source Layer-2 ID and the source IP address need to be changed.

5.6.1.4 Identifiers for Unicast Mode V2X Communication Over PC5 Reference Point

For unicast mode of V2X communication over PC5 reference point, the destination Layer-2 ID used depends on the communication peer, which is discovered during the establishment of the PC5 unicast link. The initial signalling for the establishment of the PC5 unicast link may use a default destination Layer-2 ID associated with the service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs. A UE may establish multiple PC5 unicast links with a peer UE and use the same or different source Layer-2 IDs for these PC5 unicast links.

Editor's note: Further updates of the identifier description may be required based on RAN WG feedback.

[ . . . ]

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Figure 6:
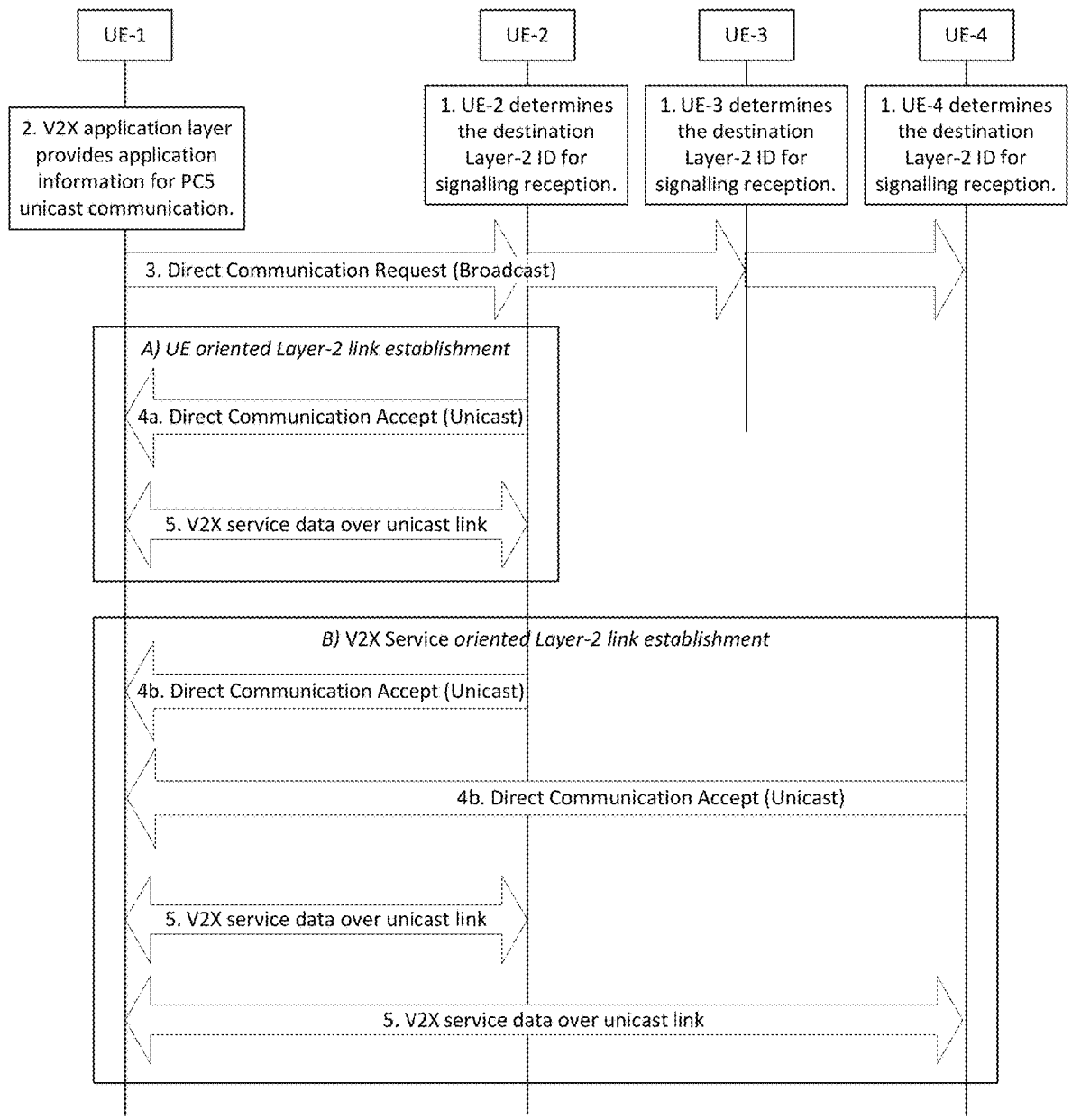
FIG. 6 is a reproduction of Figure 6.3.3.1-1 of 3GPP TS 23.287 V16.0.0.

Figure 6.3.3.1-1 shows the layer-2 link establishment procedure for unicast mode of V2X communication over PC5 reference point.

[Figure 6.3.3.1-1 of 3GPP TS 23.287 V16.0.0, entitled "Layer-2 link establishment procedure", is reproduced as FIG. 6]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.
    The V2X application layer in UE-1 may provide V2X Application Requirements for this unicast communication. UE-1 determines the PC5 QoS parameters and PFI as specified in clause 5.4.1.4.
    If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:
    Source User Info: the initiating UE's Application Layer ID (i.e. UE-Vs Application Layer ID).
    If the V2X application layer provided the target UE's Application Layer ID in step 2, the following information is included:
        Target User Info: the target UE's Application Layer ID (i.e. UE-2's Application Layer ID).
    V2X Service Info: the information about V2X Service(s) requesting Layer-2 link establishment (e.g. PSID(s) or ITS-AID(s)).
    Indication whether IP communication is used.
    IP Address Configuration: For IP communication, IP address configuration is required for this link and indicates one of the following values:
        "IPv6 Router" if IPv6 address allocation mechanism is supported by the initiating UE, i.e., acting as an IPv6 Router; or
        "IPv6 address allocation not supported" if IPv6 address allocation mechanism is not supported by the initiating UE.
    Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".
    QoS Info: the information about PC5 QoS Flow(s). For each PC5 QoS Flow, the PFI and the corresponding PC5 QoS parameters (i.e. PQI and conditionally other parameters such as MFBR/GFBR, etc).
    The source Layer-2 ID and destination Layer-2 ID used to send the Direct Communication Request message are determined as specified in clauses 5.6.1.1 and 5.6.1.4.
    UE-1 sends the Direct Communication Request message via PC5 broadcast using the source Layer-2 ID and the destination Layer-2 ID.
4. A Direct Communication Accept message is sent to UE-1 as below:
    4a. (UE oriented Layer-2 link establishment) lithe Target User Info is included in the Direct Communication Request message, the target UE, i.e. UE-2 responds with a Direct Communication Accept message.
    4b. (V2X Service oriented Layer-2 link establishment) lithe Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in Figure 6.3.3.1-1).
    The Direct Communication Accept message includes:
        Source User Info: Application Layer ID of the UE sending the Direct Communication Accept message.
        QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

IP Address Configuration: For IP communication, IP address configuration is required for this link and indicates one of the following values: "IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 1: When either the initiating UE or the target UE indicates the support of IPv6 router, corresponding address configuration procedure would be carried out after the establishment of the layer 2 link, and the link-local IPv6 addresses are ignored.

The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.

Upon receiving the Direct Communication Accept message from peer UE, UE-1 obtains the peer UE's Layer-2 ID for future communication, for signalling and data traffic for this unicast link.

The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Editor's note: Steps for mutual authentication and security association establishment will be determined based on feedback from SA WG3.

5. V2X service data is transmitted over the established unicast link as below:

The PC5 Link Identifier and PFI are provided to the AS layer, together with the V2X service data.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 2: PC5 unicast link is bi-directional, therefore the peer UE of UE-1 can send the V2X service data to UE-1 over the unicast link with UE-1.

Editor's note: The parameters included in the Direct Communication Request/Accept messages can be updated depending on RAN WGs' decision on how the Direct Communication Request/Accept messages are sent by the AS layer (e.g. by using PC5-RRC signalling).

Editor's note: Additional parameters included in the Direct Communication Request/Accept messages (e.g. security related) are FFS.

Editor's note: Whether the unicast communication requires security protection at link layer will be determined based on feedback from SA WG3.

3GPP TS 38.885 specifies QoS (Quality of Service) management for NR (New RAT/Radio) V2X unicast mode communication as follows:

7 QoS Management

QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.

For SL unicast, groupcast and broadcast, QoS parameters of V2X packets are provided by upper layers to the AS. For SL unicast, the SLRBs are (pre-)configured based on the signalling flows and procedures shown in Figures 7-1 and 7-2. The per-flow QoS model described in [6] is assumed in upper layers.

Figure 7:
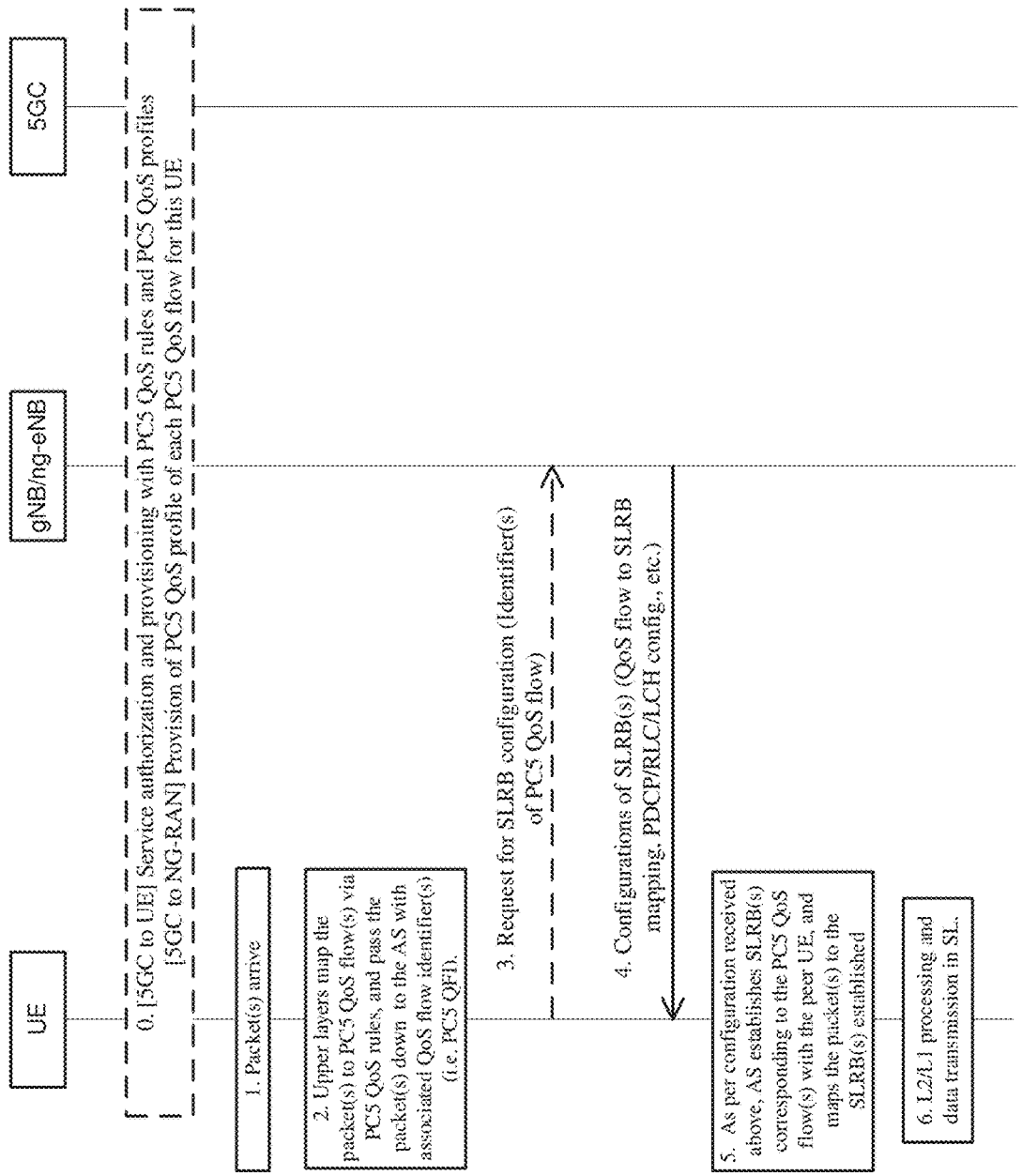
FIG. 7 is a reproduction of Figure 7-1 of 3GPP TR 38.885 V16.0.0.

[Figure 7-1 of 3GPP TS 38.885 V16.0.0, entitled "SLRB configuration for SL unicast (UE-specific)", is reproduced as FIG. 7]

In Step 0 of Figure 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.

[ . . . ]

3GPP R2-1908107 captures the RAN2#106 agreements on NR SL QoS and SLRB configurations as follows:

1: Stick to SI phase conclusion that SLRB configurations should be NW-configured and/or pre-configured for NR SL.

2: For an RRC_CONNECTED UE, for transmission of a new PC5 QoS flow, it may report the QoS information of the PC5 QoS flow via RRC dedicated signalling to the gNB/ng-eNB. FFS on the exact timing about when UE initiates.=> This implies SLRB configurations of multiple PC5 QoS flows of a PC5 service may be requested at different timings.

3: For an RRC_CONNECTED UE, the gNB/ng-eNB may provide SLRB configurations and configure the mapping of PC5 QoS flow to SLRB via RRC dedicated signalling, based on the QoS information reported by the UE. The UE can establishes/reconfigures the SLRB only after receiving the SLRB configuration. FFS when the UE establishes/reconfigures the SLRB.

4: FFS what the reported QoS information is (e.g. PFI, PC5 QoS profile, etc.) and what is used to realize the PC5 QoS flow to SLRB mapping (e.g. PFI to SLRB mapping, QoS profile to SLRB mapping, etc.), depending on SA2 conclusion on how PFI is assigned.

5: For RRC_IDLE/INACTIVE UEs, the gNB/ng-eNB may provide SLRB configurations and configure the PC5 QoS profile to SLRB mapping via V2X-specific SIB. When an RRC_IDLE/INACTIVE UE initiates the transmission of a new PC5 QoS flow, it establishes the SLRB associated with the PC5 QoS profile of that flow based on SIB configuration.

6: FFS how to describe each PC5 QoS profile in the SIB, pending SA2's final conclusion on what PC5 QoS parameters are included in a PC5 QoS profile.

7: For OoC UEs, SLRB configurations and the mapping of PC5 QoS profile to SLRB are pre-configured. When an OoC UE initiates the transmission of a new PC5 QoS flow, it establishes the SLRB associated with the flow based on pre-configuration.

8: FFS what is used to realize for PC5 QoS flow to SLRB mapping in pre-configuration (e.g. PFI to SLRB mapping, QoS profile to SLRB mapping, etc.), depending on SA2 conclusion on how PFI is assigned.

9: For SL unicast of a UE, the NW-configured/pre-configured SLRBs configurations include the SLRB parameters that are only related to TX, as well as the SLRB parameters that are related to both TX and RX and need to be aligned with the peer UEs.

10: For SL unicast, the initiating UE informs the peer UE of SLRB parameters that are related to both TX and RX and need to be aligned with the peer UEs. FFS on the detailed parameters.

11: For SL unicast, do not allow a UE to configure "SLRB parameters only related to TX" for the peer UE in SL via PC5 RRC message. FFS how to handle SRLB parameters only related to RX.

12: For SL groupcast and/or broadcast, the NW-configured/preconfigured SLRBs include the SLRB parameters that are only related to TX.

13: Those SLRB parameters which are related to both TX and RX and thus need to be aligned between a UE and all its peer UE(s) should be fixed in the Spec for SL groupcast and broadcast.

14: For SL broadcast, how to set SLRB parameters only related to RX is up to UE implementation. FFS for groupcast case.

15: SLRB configurations should be (pre-)configured for SL unicast, groupcast/broadcast separately. FFS on the need of separate SLRB configurations between groupcast and broadcast.

3GPP R2-1916288 captures the RAN2#108 agreements on RLC and LCID mismatch as follows:

1: When the peer UE in RRC_CONNECTED receives an SLRB configuration with RLC AM/UM from the initiating UE via PC5 RRC and if the LCH has not been configured in the peer UE, it reports at least RLC mode by the initiating UE via PC5 RRC to its gNB. PC5 QoS profile is optional to be reported.

2: When the peer UE in RRC_CONNECTED receives an SLRB configuration with RLC AM/UM for a specific LCID via PC5 RRC from the initiating UE and if the LCH has not been configured in the peer UE, the peer UE autonomously determines to follow the usage of this LCID by the initiating UE, and assigns this LCID to a dedicated SLRB configuration with RLC AM requested from its gNB. (working assumption)

3: When the peer UE in RRC_IDLE/INACTIVE receives an SLRB configuration with RLC AM/UM for a specific LCID via PC5 RRC from the initiating UE and if the LCH has not been configured in the peer UE, the peer UE autonomously assigns this LCID value to the configured SLRB. Up to UE implementation to configure SRLB with the corresponding RLC mode by selecting existing SLRB configurations in SIB.

4: When the peer UE in OOC receives an SLRB configuration with RLC AM/UM for a specific LCID via PC5 RRC from the initiating UE and if the LCH has not been configured in the peer UE, the peer UE autonomously assigns this LCID value to the configured SLRB. Up to UE implementation to configure SRLB with the corresponding RLC mode by selecting existing SLRB configurations in preconfiguration.

5: LCID for NR sidelink communication is assigned by the UE.

6: If the LCH has been configured with the different RLC mode in the peer UE, UE handles that as AS-layer configuration failure.

7: TS38.331 will capture the agreements "Up to UE implementation to configure SRLB with the corresponding RLC mode by selecting existing SLRB configurations in SIB" in 3) and "Up to UE implementation to configure SRLB with the corresponding RLC mode by selecting existing SLRB configurations in Preconfiguration" in 4) as NOTE.

An updated running CR to TS 38.331 for capturing new 5G V2X with NR Sidelink agreements circulated on Dec. 26, 2019 (as described in the 3GPP email discussion [108#44][V2X] 38.331 running CR (Huawei)) specifies sidelink related procedures and messages for NR V2X as follows:

5.3.5 RRC Reconfiguration

[ . . . ]

5.3.5.3 Reception of an RRCReconfiguration by the UE

The UE shall perform the following actions upon reception of the RRCReconfiguration:

[ . . . ]

1> if the RRCReconfiguration message includes the sl-ConfigDedicatedNR:

2> perform the sidelink dedicated configuration procedure as specified in 5.3.5.X;

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

| RRCReconfiguration message |
|---|
| -- ASN1START<br>-- TAG-RRCRECONFIGURATION-START<br>...<br>RRCReconfiguration-v16xy-IEs ::=    SEQUENCE {<br>    sl-ConfigDedicatedNR-r16              SetupRelease {SL-ConfigDedicatedNR-r16}<br>OPTIONAL, -- Need M<br>    sl-ConfigDedicatedEUTRA-r16           SetupRelease {SL-ConfigDedicatedEUTRA-r16}<br>OPTIONAL, -- Need M<br>    nonCriticalExtension                  SEQUENCE { }<br>OPTIONAL<br>}<br>-- TAG-RRCRECONFIGURATION-STOP<br>-- ASN1STOP<br>-      SL-ConfigDedicatedNR |

The IE SL-ConfigDedicatedNR specifies the dedicated configuration information for NR sidelink communication.

| SL-ConfigDedicatedNR information element |
|---|
| -- ASN1START<br>-- TAG-SL-CONFIGDEDICATEDNR-START<br>SL-ConfigDedicatedNR-r16 ::=          SEQUENCE {<br>    sl-ScheduledConfig-r16                SetupRelease { SL-ScheduledConfig-r16 }<br>OPTIONAL,   -- Need M<br>    sl-UE-SelectedConfig-r16              SetupRelease { SL-UE-SelectedConfig-r16 }<br>OPTIONAL,   -- Need M<br>    sl-FreqInfoToReleaseList-r16          SEQUENCE (SIZE (1..maxNrofFreqSL-r16)) OF ARFCN-<br>ValueNR      OPTIONAL,                -- Need M<br>    sl-FreqInfoToAddModList-r16           SEQUENCE (SIZE (1..maxNrofFreqSL-r16)) OF SL-<br>FreqConfig-r16      OPTIONAL,         -- Need M<br>-- Editor's Note: FFS on whether both mode-1 and mode-2 can be both configured.<br>    sl-RadioBearerToReleaseList-r16       SEQUENCE (SIZE (1..maxNrofSLRB-r16)) OF SLRB-Uu-<br>ConfigIndex-r16     OPTIONAL,         -- Need N<br>    sl-RadioBearerToAddModList-r16        SEQUENCE (SIZE (1..maxNrofSLRB-r16)) OF SL-<br>RadioBearerConfig-r16    OPTIONAL,    -- Need N<br>    sl-RLC-BearerToReleaseList-r16        SEQUENCE (SIZE (1..maxSL-LCID-r16)) OF SL-RLC-<br>BearerConfigIndex-r16    OPTIONAL,    -- Need N<br>    sl-RLC-BearerToAddModList-r16         SEQUENCE (SIZE (1..maxSL-LCID-r16)) OF SL-RLC-<br>BearerConfig-r16         OPTIONAL,    -- Need N<br>    sl-MeasConfigInfoToReleaseList-r16    SEQUENCE (SIZE (1..maxNrofSL-Dest-r16)) OF SL-<br>DestinationIndex-r16     OPTIONAL,    -- Need N<br>    sl-MeasConfigInfoToAddModList-r16     SEQUENCE (SIZE (1..maxNrofSL-Dest-r16)) OF SL-<br>MeasConfigInfo-r16       OPTIONAL,    -- Need M<br>    t400                                  ENUMERATED {ms100, ms200, ms300, ms 400, ms600,<br>ms1000, ms1500, ms2000}   OPTIONAL,    -- Need M<br>    sl-CSI-Acquisition-r16                ENUMERATED {enabled}<br>OPTIONAL,   -- Need N<br>    sl-SSB-PriorityNR-r16                 INTEGER (1..8)<br>OPTIONAL,   -- Need N<br>    sl-PUCCH-Config-r16                   PUCCH-Config<br>OPTIONAL,   -- Need N<br>    sl-PDCCH-Config-r16                   PDCCH-Config<br>OPTIONAL,   -- Need N<br>    networkControlledSyncTx-r16           ENUMERATED {on, off}<br>OPTIONAL,   -- Need N<br>...<br>}<br>-- TAG-SL-CONFIGDEDICATEDNR-STOP<br>-- ASN1STOP |

| SL-ConfigDedicatedNR field descriptions |
|---|
| networkControlledSyncTx |

This field indicates whether the UE shall transmit synchronisation information (i.e. become synchronisation source). Value On indicates the UE to transmit synchronisation information while value Off indicates the UE to not transmit such information.

| SL-ConfigDedicatedNR field descriptions |
| --- |
| sl-NR-AnchorCarrierFreqList |

This field indicates the NR anchor carrier frequency list, which can provide the NR sidelink communication configurations

| sl-FreqInfoToAddModList |
| --- |

This field indicates the NR sidelink communication configuration on some carrier frequency (ies). In this relase, only one entry can be configured in the list.

| sl-MeasConfigInfoToAddModList |
| --- |

This field indicates the RSRP measurement configurations for unicast destinations to add and/or modify.

| sl-MeasConfigInfoToReleaseList |
| --- |

This field indicates the RSRP measurement configurations for unicast destinations to remove.

| sl-RadioBearerToAddModList |
| --- |

This field indicates one or multiple sidelink radio bearer configurations.

| sl-RLC-BearerToAddModList |
| --- |

This field indicates one or multiple sidelink RLC bearer configurations.

| sl-ScheduledConfig |
| --- |

Indicates the configuration for UE to transmit NR sidelink communication based on network scheduling.

| sl-CSI-Acquisition |
| --- |

Indicates whether CSI reporting is enabled in sidelink unicast. If the field is absent, sidelink CSI reporting is disabled.

| sl-SSB-PriorityNR |
| --- |

This field indicates the priority of NR sidelink SSB transmission and reception.

| sl-PUCCH-Config |
| --- |

PUCCH configuration for sidelink communication.

| sl-PDCCH-Config |
| --- |

UE specific PDCCH configuration for scheduling sidelink communication.

[. . .]
- SL-RadioBearerConfig

The IE SL-RadioBearerConfig specifies the sidelink DRB configuration information for NR sidelink communication.

| SL-RadioBearerConfig information element |
| --- |

```
-- ASN1START
-- TAG-SL-RADIOBEARERCONFIG-START
SL-RadioBearerConfig-r16 ::=         SEQUENCE {
    slrb-Uu-ConfigIndex-r16              SLRB-Uu-ConfigIndex-r16,
    sl-SDAP-Config-r16                   SL-SDAP-Config-r16
OPTIONAL,    -- Cond SLRBSetup
    sl-PDCP-Config-r16                   SL-PDCP-Config-r16
OPTIONAL,    -- Cond SLRBSetup
    sl-TransRange-r16                    ENUMERATED {m50, m80, m180, m200, m350, m400, m500, m700, m1000}
OPTIONAL,    -- Need M
    . . .
}
-- TAG-SL-RADIOBEARERCONFIG-STOP
-- ASN1STOP
```

| SL-RadioBearerCoonfig field descriptions |
|---|
| sl-PDCP-Config |
| This field indicates the PDCP parameters for the SLRB. |
| sl-SDAP-Config |
| This field indicates how to map sidelink QoS flows to SLRB. |
| slrb-Uu-Configindex |
| This field indicates the index of SLRB configuration. |
| sl-TransRange |
| This field indicates the transmission range of the SLRB. The unit is meter. |

| Conditional Presence | Explanation |
|---|---|
| SLRBSetup | The field is mandatory present in case of SLRB setup via the dedicated signalling and in case of SLRB configuration via system information and pre-configuration; otherwise the field is optionally present, need M. |

[ . . . ]
- SL-SDAP-Config

The IE SL-SDAP-Config is used to set the configurable SDAP parameters for a Sidelink DRB.

SL-SDAP-Config information element

```
-- ASN1START
-- TAG-SL-SDAP-CONFIG-START
SL-SDAP-Config-r16 ::=                SEQUENCE {
  sl-SDAP-Header-r16                  ENUMERATED {present, absent},
  sl-DefaultRB-r16                    BOOLEAN,
  sl-MappedQoS-Flows-r16              CHOICE {
    sl-MappedQoS-FlowsList-r16          SEQUENCE (SIZE (1..maxNrofSL-QFIs-r16)) OF SL-QoS-Profile-r16,
    sl-MappedQoS-FlowsListDedicated-r16  SL-MappedQoS-FlowsListDedicated-r16
  }
OPTIONAL,   -- Need M
  sl-CastType-r16                     ENUMERATED {broadcast, groupcast, unicast, sparel}
OPTIONAL,   -- Need M
  ...
}
SL-MappedQoS-FlowsListDedicated-r16 r16   SEQUENCE {
  sl-MappedQoS-FlowsToAddList-r16       SEQUENCE (SIZE (1..maxNrofSL-QFIs-r16)) OF SL-QoS-FlowIdentity-r16   OPTIONAL,   -- Need N
  sl-MappedQoS-FlowsToReleaseList-16    SEQUENCE (SIZE (1..maxNrofSL-QFIs-r16)) OF SL-QoS-FlowIdentity-r16   OPTIONAL    -- Need N
}
-- TAG-SL-SDAP-CONFIG-STOP
-- ASN1STOP
```

| SDAP-Config field descriptions |
|---|
| sl-DefaultRB |
| Indicates whether or not this is the default SLRB for this NR sidelink communication transmission destination. Among all configured instances of SL-SDAP-Config with the same value of sl-DestinationIdentity, this field shall be set to true in at most one instance of SL-SDAP-Config and to false in all other instances. |
| sl-MappedQoS-Flows |
| Indicates QoS flows to be mapped to the SLRB. The sl-MappedQoS-FlowsListDedicated is optionally present in case of dedicated signanling. Otherwise, the sl-MappedQoS-FlowsList is optionally present. |

| SDAP-Config field descriptions |
| --- |
| SL-QoS-InfoConfig |
| Indicates QoS flows information. The sl-QoS-FlowIdentity is present in case of dedicated signanling. Otherwise, the sl-QoS-Profile is present. |
| sl-MappedQoS-FlowsToAddList |
| Indicates the list of SL QoS flows ID of the NR sidelink communication transmission destination to be additionally mapped to this SLRB. |
| sl-MappedQoS-FlowsToReleaseList |
| Indicates the list of SL QoS flows ID of the NR sidelink communication transmission destination to be released from existing QoS flow to SLRB mapping of this SLRB. |
| sl-SDAP-Header |
| Indicates whether or not a SDAP header is present on this sidelink DRB. The field cannot be changed after a sidelink DRB is established. This field is set to present if the field sl-DefaultRB is set to true. |

| SL-QoS-InfoConfig field descriptions |
| --- |
| sl-QoS-FlowIdentity |
| Indicates QoS flow, which is asscoicated with one cast type and one destination ID. It is unique cast types and destinations ID across of one UE.. |
| sl-QoS-Profile |
| Identity of the NR sidelink communication transmission cast type whose SL QoS flows are mapped to the SLRB. |

Figure 8:
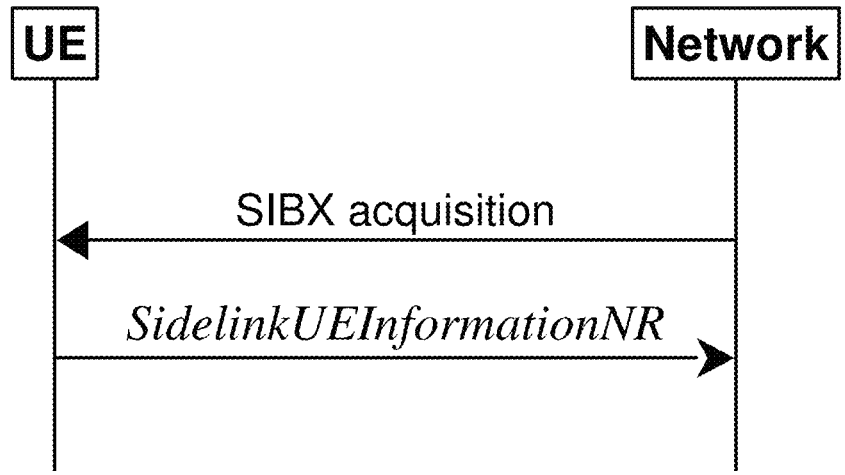
FIG. 8 is a reproduction of Figure 5.X.3.1-1 provided in the 3GPP email discussion [108#44][V2X] 38.331 running CR (Huawei).

[ . . . ]
5.X.3 Sidelink UE Information for NR Sidelink Communication
5.X.3.1 General
  [Figure 5.X.3.1-1 of 3GPP email discussion [108#44] [V2X] 38.331 running CR (Huawei), entitled "Sidelink UE information for NR sidelink communication", is reproduced as FIG. 8]
The purpose of this procedure is to inform the network that the UE is interested or no longer interested to receive NR sidelink communication, as well as to request assignment or release of transmission resource for NR sidelink communication and to report parameters related to NR sidelink communication.
5.x.3.2 Initiation
A UE capable of NR sidelink communication that is in RRC_CONNECTED may initiate the procedure to indicate it is (interested in) receiving NR sidelink communication in several cases including upon successful connection establishment or resuming, upon change of interest, upon change to a PCell providing SIBX including sl-ConfigCommonNR. A UE capable of NR sidelink communication may initiate the procedure to request assignment of dedicated resources for NR sidelink communication transmission.
Upon initiating this procedure, the UE shall:
  1> if SIBX including sl-ConfigCommonNR is provided by the PCell:
    2> ensure having a valid version of SIBX for the PCell;
    2> if configured by upper layers to receive NR sidelink communication on the frequency included in sl-FreqInfoList in SIBX of the PCell:
      3> if the UE did not transmit a SidelinkUEInformationNR message since last entering RRC_CONNECTED state; or
      3> if since the last time the UE transmitted a SidelinkUEInformationNR message the UE connected to a PCell not providing SIBX including sl-ConfigCommonNR; or
      3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
        4> initiate transmission of the SidelinkUEInformationNR message to indicate the NR sidelink communication reception frequency of interest in accordance with 5.x.3.3;
    2> else:
      3> if the last transmission of the SidelinkUEInformationNR message included sl-RxInterestedFreqList:
        4> initiate transmission of the SidelinkUEInformationNR message to indicate it is no longer interested in NR sidelink communication reception in accordance with 5.x.3.3;
    2> if configured by upper layers to transmit NR sidelink communication on the frequency included in sl-FreqInfoList in SIBX of the PCell:
      3> if the UE did not transmit a SidelinkUEInformationNR message since last entering RRC_CONNECTED state; or
      3> if since the last time the UE transmitted a SidelinkUEInformationNR message the UE connected to a PCell not providing SIBX including sl-ConfigCommonNR; or
      3> if the last transmission of the SidelinkUEInformationNR message did not include sl-TxResourceReqList; or if the information carried by the sl-TxResourceReqList has changed since the last transmission of the SidelinkUEInformationNR message:
    4> initiate transmission of the SidelinkUEInformationNR message to indicate the NR sidelink communication transmission resources required by the UE in accordance with 5.X.3.3;
2> else:
  3> if the last transmission of the SidelinkUEInformationNR message included sl-TxResourceReqList:
    4> initiate transmission of the SidelinkUEInformationNR message to indicate it no longer requires NR sidelink communication transmission resources in accordance with 5.X.3.3.

5.x.3.3 Actions Related to Transmission of SidelinkUEInformationNR Message

The UE shall set the contents of the SidelinkUEInformationNR message as follows:
  1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
  2> if SIBX including sl-ConfigCommonNR is provided by the PCell:
    3> if configured by upper layers to receive NR sidelink communication:
      4> include sl-RxInterestedFreqList and set it to the frequency for NR sidelink communication reception;
    3> if configured by upper layers to transmit NR sidelink communication:
      4> include sl-TxResourceReqList and set its fields as follows for each destination for which it requests network to assign NR sidelink communication resource:
        5> set sl-DestinationIdentity to the destination identity configured by upper layer for NR sidelink communication transmission;
        5> set sl-CastType to the cast type of the associated destination identity configured by the upper layer for the NR sidelink communication transmission;
        5> set sl-RLC-ModeIndication to include the RLC mode(s) and optionally QoS profile(s) of the sidelink QoS flow(s) of the associated RLC mode(s), if the associated bi-directional sidelink DRB addition is due to the configuration by RRCReconfigurationSidelink;
        5> set sl-Failure for the associated destination for the NR sidelink communication transmission, if the sidelink RLF is detected;
        5> set sl-QoS-InfoList to include QoS profile(s) of the sidelink QoS flow(s) of the associated destination configured by the upper layer for the NR sidelink communication transmission;
        5> set sl-InterestedFreqList to indicate the frequency for NR sidelink communication transmission;
        5> set sl-TypeTxSyncList to the current synchronization reference type used on the associated sl-InterestedFreqList for NR sidelink communication transmission.
  1> The UE shall submit the SidelinkUEInformationNR message to lower layers for transmission.

[ ... ]

SidelinkUEInformationNR

The SidelinkUEinformationNR message is used for the indication of NR sidelink UE information to the network.

Signalling radio bearer: SRB1
RLC-SAP: AM
Logical channel: DCCH
Direction: UE to Network

| SidelinkUEInformationNR message |
| --- |

```
-- ASN1START
-- TAG-SIDELINKUEINFORMATIONNR-START
SidelinkUEInformationNR-r16::=                SEQUENCE {
    criticalExtensions                            CHOICE {
        sidelinkUEInformationNR-r16                   SidelinkUEInformationNR-r16-IEs,
        criticalExtensionsFuture                      SEQUENCE { }
    }
}
SidelinkUEInformationNR-r16-IEs::=            SEQUENCE {
    sl-RxInterestedFreqList-r16                   SL-InterestedFreqList-r16      OPTIONAL,
    sl-TxResourceReqList-r16                      SL-TxResourceReqList-r16       OPTIONAL,
    lateNonCriticalExtension                      OCTET STRING                   OPTIONAL,
    nonCriticalExtension                          SEQUENCE { }                   OPTIONAL
}
SL-InterestedFreqList-r16                     SEQUENCE (SIZE (1..maxNrofFreqSL-r16)) OF INTEGER
(1..maxNrofFreqSL-r16)
SL-TxResourceReqList-r16 ::=                  SEQUENCE (SIZE (1..maxNrofSL-Dest-r16)) OF SL-
TxResourceReq-r16
SL-TxResourceReq-r16::=                       SEQUENCE {
    sl-DestinationIdentity-r16                    SL-DestinationIdentity-r16,
    sl-CastType-r16                               ENUMERATED {broadcast, groupcast, unicast, sparel},
    sl-RLC-ModeIndication-r16                     SEQUENCE {
        sl-AM-Mode-r16                                SEQUENCE {
            sl-AM-Mode-r16                                ENUMERATED {true},
            sl-AM-QoS-InfoList-r16                        SEQUENCE (SIZE (1..maxNrofSL-QFIsPerDest-r16)) OF
SL-QoS-Info-r16      OPTIONAL
        }
        OPTIONAL,
        sl-UM-Mode-r16                                SEQUENCE {
            sl-UM-Mode-r16                                ENUMERATED {true},
            sl-UM-QoS-InfoList-r16                        SEQUENCE (SIZE (1..maxNrofSL-QFIsPerDest-r16)) OF
```

| SidelinkUEInformationNR message |  |
|---|---|
| SL-QoS-Info-r16                OPTIONAL<br>}<br>OPTIONAL<br>}<br>OPTIONAL,<br>   sl-QoS-InfoList-r16 | SEQUENCE (SIZE (1..maxNrofSL-QFIsPerDest-r16)) OF SL-QoS-Info-r16        OPTIONAL, |
|    sl-Failure-r16 | ENUMERATED {true}     OPTIONAL, |
|    sl-TypeTxSyncList-r16 | SEQUENCE (SIZE (1..maxNrofFreqSL-r16)) OF SL-TypeTxSync-r16      OPTIONAL, |
|    sl-TxInterestedFreciList-r16<br>(1..maxNrofFreqSL-r16)    OPTIONAL<br>}<br>SL-QoS-Info-r16 ::=<br>   sl-QoS-FlowIdentity-r16<br>   sl-QoS-Profile-r16<br>}<br>-- TAG-SIDELINKUEINFORMATIONNR-STOP<br>-- ASN1STOP<br>[. . .] | SEQUENCE (SIZE (1..maxNrofFreqSL-r16)) OF INTEGER<br><br>SEQUENCE {<br>SL-QoS-FlowIdentity-r16,<br>SL-QoS-Profile-r16 |

| SidelinkUEinformationNR field descriptions |
|---|
| sl-RxinterestedFreqList |
| Indicates the index of frequency on which the UE is interested to receive NR sidelink communication. The value 1 corresponds to the frequency of first entry in sl-FreqInfoList broadcast in SIBX, the value 2 corresponds to the frequency of second entry in sl-FreqInfoList broadcast in SIBX and so on. In this release, only value 1 can be included in the interested frequency list. |

| SidelinkUEinformationNR field descriptions |
|---|
| sl-TxResourceReq |
| Paramters to request the transmisison resouces for NR sidelink communication to the network in the Sidelink UE Information report. |

| SL-TxResourceReq field descriptions |
|---|
| sl-CastType |
| Indicates the case type for the correponding destination for which to request the resource. |
| sl-DestinationIdentity |
| Indicates the destination for which to request the resource. |
| sl-Failure |
| Indicates the sidelink RLF for the associated destination, when the sidelink RLF is detected. |
| sl-QoS-InfoList |
| Includes the QoS profile of the sidelink QoS flow as specified in TS 23.287 [xx] |
| sl-QoS-FlowIdentity |
| This identity uniquely identifies one sidelink QoS flow in the scope of UE, which is unique for different destination and cast type. |
| sl-RLC-ModeIndication |
| This field indicates the RLC mode and optionally the related QoS profiles for the sidelink radio bearer, which has not been configured by the network and is initiated by another UE in unicast. |

| SL-TxResourceReq field descriptions |
|---|
| sl-TxInterestedFreqList |
| Each entry of this field indicates the index of frequency on which the UE is interested to transmit NR sidelink communication. The value 1 corresponds to the frequency of first entry in sl-FreqInfoList broadcast in SIBX, the value 2 corresponds to the frequency of second entry in sl-FreqInfoList broadcast in SIBX and so on. In this release, only value 1 can be included in the interested frequency list. In this relase, only one entry can be included in the list. |
| sl-TypeTxSyncList |
| A list of synchronization reference used by the UE. The UE shall include the same number of entries, listed in the same order, as in sl-Tx!nterestedFreqList, i.e. one for each carrier freqeuncy included in sl-TxInterestedFreqList.<br>[...] |

Figure 9:
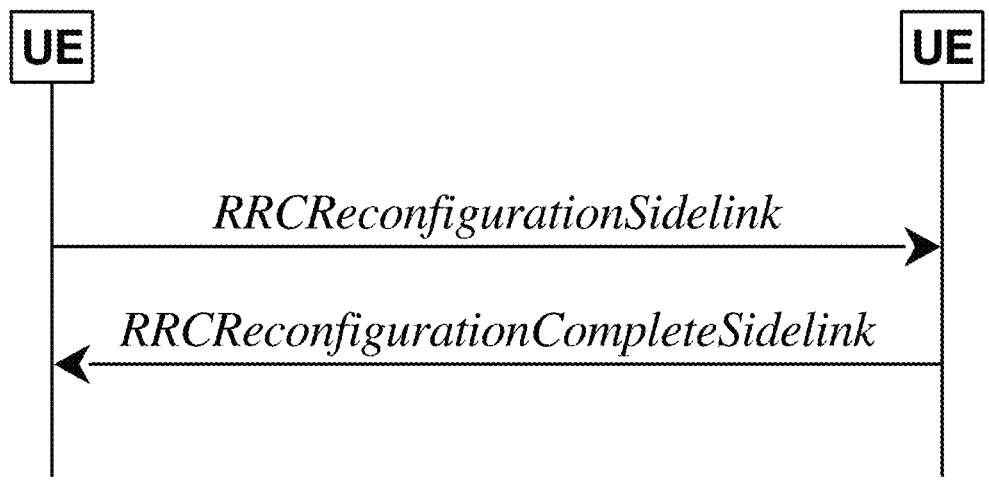
FIG. 9 is a reproduction of Figure 5.x.9.1.1-1 of 3GPP email discussion [108#44][V2X] 38.331 running CR (Huawei).
Figure 10:
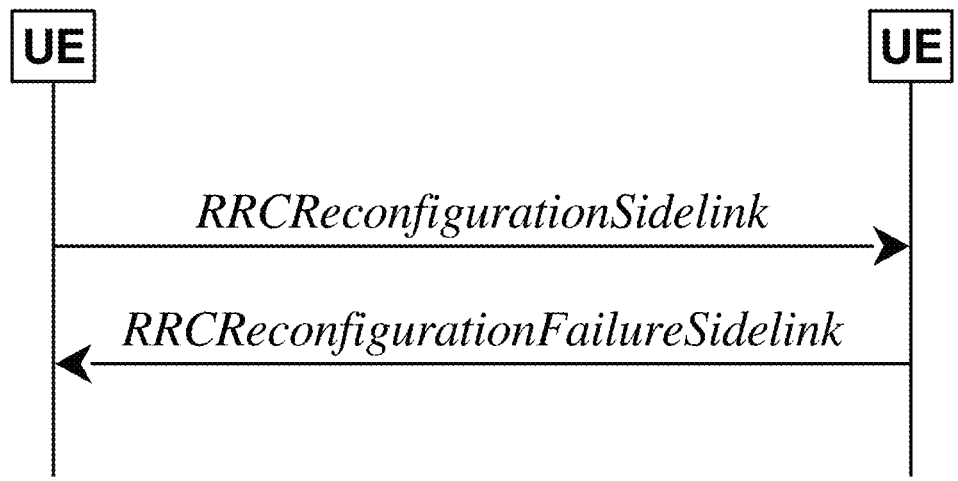
FIG. 10 is a reproduction of Figure 5.x.9.1.1-2 of 3GPP email discussion [108#44][V2X] 38.331 running CR (Huawei).

5.X.9 Sidelink RRC Procedure
5.X.9.1 Sidelink RRC Reconfiguration
5.x.9.1.1 General
  [Figure 5.x.9.1.1-1 of 3GPP email discussion [108#44] [V2X] 38.331 running CR (Huawei), entitled "Sidelink RRC reconfiguration, successful", is reproduced as FIG. 9]
  [Figure 5.x.9.1.1-2 of 3GPP email discussion [108#44] [V2X] 38.331 running CR (Huawei), entitled "Sidelink RRC reconfiguration, failure", is reproduced as FIG. 10]
The purpose of this procedure is to establish/modify/release sidelink DRBs or configure NR sidelink measurement and report for a PC5-RRC connection.
The UE may initiate the sidelink RRC reconfiguration procedure and perform the operation in sub-clause 5.x.9.1.2 to its peer UE in following cases:
  the release of sidelink DRBs associated with the peer UE, as specified in sub-clause 5.x.9.1.4;
  the establishment of sidelink DRBs associated with the peer UE, as specified in sub-clause 5.x.9.1.5;
  the modification for the parameters included in SLRB-Config of sidelink DRBs associated with the peer UE, as specified in sub-clause 5.x.9.1.5;
  the configuration of the peer UE to perform NR sidelink measurement and report.
5.x.9.1.2 Actions Related to Transmission of RRCReconfigurationSidelink Message
The UE shall set the contents of RRCReconfigurationSidelink message as follows:
  1> for each sidelink DRB that is to be released, according to sub-clause 5.x.9.1.4.1, due to configuration by sl-ConfigDedicatedNR, SIBX, SidelinkPreconfigNR or by upper layers:
    2> set the slrb-PC5-ConfigIndex included in the slrb-ConfigToReleaseList corresponding to the sidelink DRB;
  1> for each sidelink DRB that is to be established or modified, according to sub-clause 5.x.9.1.5.1, due to receiving sl-ConfigDedicatedNR, SIBX, SidelinkPreconfigNR:
    2> set the SLRB-Config included in the slrb-ConfigToAddModList, according to the received sl-RadioBearerConfig and sl-RLC-BearerConfig corresponding to the sidelink DRB;
  1> for each NR sidelink measurement and report that is to be configured:
    2> set the sl-MeasConfig according to the stored NR sidelink measurement configuration information;
    1> start timer T400 for the destination associated with the sidelink DRB;
The UE shall submit the RRCReconfigurationSidelink message to lower layers for transmission.
5.x.9.1.3 Reception of an RRCReconfigurationSidelink by the UE
The UE shall perform the following actions upon reception of the RRCReconfigurationSidelink:
  1> if the RRCReconfigurationSidelink includes the slrb-ConfigToReleaseList:
    2> for each slrb-PC5-ConfigIndex value included in the slrb-ConfigToReleaseList that is part of the current UE sidelink configuration;
      3> perform the sidelink DRB release procedure, according to sub-clause 5.x.9.1.4;
  1> if the RRCReconfigurationSidelink includes the slrb-ConfigToAddModList:
    2> for each slrb-PC5-ConfigIndex value included in the slrb-ConfigToAddModList that is not part of the current UE sidelink configuration:
      3> apply the sl-MappedQoS-FlowsToAddList and sl-MappedQoS-FlowsToReleaseList, if included;
      3> perform the sidelink DRB addition procedure, according to sub-clause 5.x.9.1.5;
    2> for each slrb-PC5-ConfigIndex value included in the slrb-ConfigToAddModList that is part of the current UE sidelink configuration:
      3> apply the sl-MappedQoS-FlowsToAddList and sl-MappedQoS-FlowsToReleaseList, if included;
      3> perform the sidelink DRB release or modification procedure, according to sub-clause 5.x.9.1.4 and 5.x.9.1.5.
  1> if the UE is unable to comply with (part of) the configuration included in the RRCReconfigurationFailureSidelink (i.e. sidelink RRC reconfiguration failure):
    2> continue using the configuration used prior to the reception of RRCReconfigurationFailureSidelink message;
    2> set the content of the RRCReconfigurationFailureSidelink message;
      3> submit the RRCReconfigurationFailureSidelink message to lower layers for transmission;
  1> else:
    2> set the content of the RRCReconfigurationCompleteSidelink message;
      3> submit the RRCReconfigurationCompleteSidelink message to lower layers for transmission;
NOTE X: When the same logical channel is configured with different RLC mode by another UE, the UE handles the case as sidelink RRC reconfiguration failure.

[ ... ]
RRCReconfigurationSidelink
The RRCReconfigurationSidelink message is the command to AS configuration of the PC5 RRC connection. It is only applied to unicast of NR sidelink communication.

Signalling radio bearer: Sidelink SRB for PC5-RRC
RLC-SAP: AM
Logical channel: SCCH
Direction: UE to UE

```
-- ASN1START
-- TAG-RRCRECONFIGURATIONSIDELINK-START
RRCReconfigurationSidelink ::=                SEQUENCE {
    rrc-TransactionIdentifier-r16                 RRC-TransactionIdentifier,
    criticalExtensions                            CHOICE {
        rrcReconfigurationSidelink-r16                RRCReconfigurationSidelink-IEs-r16,
        criticalExtensionsFuture                      SEQUENCE { }
    }
}
RRCReconfigurationSidelink-IEs-r16 ::=        SEQUENCE {
    slrb-ConfigToAddModList-r16                   SEQUENCE (SIZE (1..maxNrofSLRB-r16)) OF SLRB-Config-r16           OPTIONAL,
    slrb-ConfigToReleaseList-r16                  SEQUENCE (SIZE (1..maxNrofSLRB-r16)) OF SLRB-PC5-ConfigIndex-r16     OPTIONAL,
    sl-MeasConfig-r16                             SL-MeasConfig-r16             OPTIONAL,
    sl-CSI-Config-r16                             SL-CSI-Config-r16             OPTIONAL,
    lateNonCriticalExtension                      OCTET STRING                  OPTIONAL,
    nonCriticalExtension                          SEQUENCE { }                  OPTIONAL
}
SLRB-Config-r16::=                            SEQUENCE {
    slrb-PC5-ConfigIndex-r16                      SLRB-PC5-ConfigIndex-r16,
    sl-SDAP-Config-r16                            SL-SDAP-Config-r16
OPTIONAL, -- Need N
    sl-PDCP-Config-r16                            SL-PDCP-Config-r16
OPTIONAL, -- Need N
    sl-RLC-Config-r16                             SL-RLC-Config-r16
OPTIONAL, -- Need N
    sl-MAC-LogicalChannelConfig-r16               SL-LogicalChannelConfig-r16
OPTIONAL, -- Need N
    ...
}
SLRB-PC5-ConfigIndex-r16 ::=                  INTEGER (1..maxNrofSLRB-r16)
SL-SDAP-Config-r16 ::=                        SEQUENCE {
    sl-MappedQoS-FlowsToAddList-r16               SEQUENCE (SIZE (1..maxNrofSL-QFIs-r16)) OF SL-PFI-r16          OPTIONAL, -- Need N
    sl-MappedQoS-FlowsToReleaseList-16            SEQUENCE (SIZE (1..maxNrofSL-QFIs-r16)) OF SL-PFI-r16          OPTIONAL, -- Need N
    ...
}
-- Editor's note: double check if it is OK to use the same filed name with the one in NR-RRC-Definitions.
SL-PDCP-Config-r16 ::=                        SEQUENCE {
    sl-PDCP-SN-Size-r16                           ENUMERATED {len12bits, len18bits}
OPTIONAL, -- Need N
    sl-HeaderCompression-r16                      CHOICE {
        notUsed-r16                                   NULL,
        rohc-r16                                      SEQUENCE {
            maxCID-r16                                    INTEGER (1..16383)
DEFAULT 15
        }
    },
    ...
}
SL-RLC-Config-r16 ::=                         CHOICE {
    sl-AM-RLC-r16                                 SEQUENCE {
        sl-SN-FieldLengthAM-r16                       SN-FieldLengthAM
OPTIONAL,    -- Need M
        ...
    },
    sl-UM-Bi-Directional-RLC-r16                  SEQUENCE {
        sl-SN-FieldLengthUM-r16                       SN-FieldLengthUM
OPTIONAL,    -- Need M
        ...
    },
    sl-UM-Uni-Directional-RLC-r16                 SEQUENCE {
        sl-SN-FieldLengthUM-r16                       SN-FieldLengthUM
OPTIONAL,    -- Need M
        ...
    }
}
```

```
SL-LogicalChannelConfig-r16 ::=          SEQUENCE {
    sl-LogicalChannelIdentity-r16            LogicalChannelIdentity,
    ...
}
SL-PFI-r16 ::=                           INTEGER (1..64)
SL-CSI-RS-Config-r16 ::=                 SEQUENCE {
    sl-CSI-RS-FreqAllocation-r16             CHOICE {
        sl-OneAntennaPort-r16                    BIT STRING (SIZE (12)),
        sl-TwoAntennaPort-r16                    BIT STRING (SIZE (6))
    }
OPTIONAL,   -- Need N
    sl-CSI-RS-FirstSymbol-r16                INTEGER (FFS)
OPTIONAL,   -- Need N
    ...
}
-- TAG-RRCRECONFIGURATIONSIDELINK-STOP
-- ASN1STOP
[...]
```

| RRCReconfigurationSidelink field descriptions |
| --- |
| sl-CSI-RS-FreqAllocation |
| Indicates the frequency domain position for sidelink CSI-RS. |
| sl-CSI-RS-FirstSymbol |
| Indicates the position of first symbol of sidelink CSI-RS. |
| sl-LogicalChannelIdentity |
| Indicates the identity of the sidelink logical channel. |
| sl-MappedQoS-FlowsToAddList |
| Indicate the QoS flows to be mapped to the configured SLRB. Each entry is indicated by the SL-PFI, as defined in TS 23.287 [xx]. |
| sl-MappedQoS-FlowsToReleaseList |
| Indicate the QoS flows to be released from the configured SLRB. Each entry is indicated by the SL-PFI, as defined in TS 23.287 [xx]. |
| sl-MeasConfig |
| Indicates the sidelink measurement configuration for the unicast destination. |
| sl-PDCP-SN-Size |
| Indicates the PDCP SN size of the configured SLRB. |
| sl-RLC-Mode |
| Indicates the RLC configurations whichi is asscicated with the configured SLRB. |

RRCReconfigurationCompleteSidelink
The RRCReconfigurationCompleteSidelink message is used to confirm the successful completion of a PC5 RRC AS reconfiguration. It is only applied to unicast of NR sidelink communication.
   Signalling radio bearer: Sidelink SRB for PC5-RRC
   RLC-SAP: AM
   Logical channel: SCCH
   Direction: UE to UE

| RRCReconfigurationCompleteSidelink message |
| --- |

```
-- ASN1START
-- TAG-RRCRECONFIGURATIONCOMPLETESIDELINK-START
RRCReconfigurationCompleteSidelink ::=   SEQUENCE {
    rrc-TransactionIdentifier-r16            RRC-TransactionIdentifier,
    criticalExtensions                       CHOICE {
        rrcReconfigurationCompleteSidelink-r16   RRCReconfigurationCompleteSidelink-IEs-r16,
        criticalExtensionsFuture                 SEQUENCE { }
    }
}
```

-continued

| RRCReconfigurationCompleteSidelink message |
| --- |
| RRCReconfigurationCompleteSidelink-IEs-r16 ::=    SEQUENCE { <br> -- FFS on the details <br>    lateNonCriticalExtension            OCTET STRING OPTIONAL, <br>    nonCriticalExtension                SEQUENCE { } OPTIONAL <br> } <br> -- TAG-RRCRECONFIGURATIONCOMPLETESIDELINK-STOP <br> -- ASN1STOP |

3GPP TS 38.322 introduces RLC status report as follows:
5.2.3 AM Data Transfer
5.2.3.1 Transmit Operations
5.2.3.1.1 General
The transmitting side of an AM RLC entity shall prioritize transmission of RLC control PDUs over AMD PDUs. The transmitting side of an AM RLC entity shall prioritize transmission of AMD PDUs containing previously transmitted RLC SDUs or RLC SDU segments over transmission of AMD PDUs containing not previously transmitted RLC SDUs or RLC SDU segments.
The transmitting side of an AM RLC entity shall maintain a transmitting window according to the state variable TX_Next_Ack as follows:
    a SN falls within the transmitting window if TX_Next_Ack<=SN<TX_Next_Ack+AM_Window_Size;
    a SN falls outside of the transmitting window otherwise.
The transmitting side of an AM RLC entity shall not submit to lower layer any AMD PDU whose SN falls outside of the transmitting window.
For each RLC SDU received from the upper layer, the AM RLC entity shall:
    associate a SN with the RLC SDU equal to TX_Next and construct an AMD PDU by setting the SN of the AMD PDU to TX_Next;
    increment TX_Next by one.
When submitting an AMD PDU that contains a segment of an RLC SDU, to lower layer, the transmitting side of an AM RLC entity shall:
    set the SN of the AMD PDU to the SN of the corresponding RLC SDU.
The transmitting side of an AM RLC entity can receive a positive acknowledgement (confirmation of successful reception by its peer AM RLC entity) for an RLC SDU by the following:
    STATUS PDU from its peer AM RLC entity.
When receiving a positive acknowledgement for an RLC SDU with SN=x, the transmitting side of an AM RLC entity shall:
    send an indication to the upper layers of successful delivery of the RLC SDU;
    set TX_Next_Ack equal to the SN of the RLC SDU with the smallest SN, whose SN falls within the range TX_Next_Ack<=SN<=TX_Next and for which a positive acknowledgments has not been received yet.
[ . . . ]
5.3.2 Retransmission
The transmitting side of an AM RLC entity can receive a negative acknowledgement (notification of reception failure by its peer AM RLC entity) for an RLC SDU or an RLC SDU segment by the following:
    STATUS PDU from its peer AM RLC entity.
When receiving a negative acknowledgement for an RLC SDU or an RLC SDU segment by a STATUS PDU from its peer AM RLC entity, the transmitting side of the AM RLC entity shall:
    if the SN of the corresponding RLC SDU falls within the range TX_Next_Ack<=SN<TX_Next:
        consider the RLC SDU or the RLC SDU segment for which a negative acknowledgement was received for retransmission.
When an RLC SDU or an RLC SDU segment is considered for retransmission, the transmitting side of the AM RLC entity shall:
    if the RLC SDU or RLC SDU segment is considered for retransmission for the first time:
        set the RETX_COUNT associated with the RLC SDU to zero.
    else, if it (the RLC SDU or the RLC SDU segment that is considered for retransmission) is not pending for retransmission already and the RETX_COUNT associated with the RLC SDU has not been incremented due to another negative acknowledgment in the same STATUS PDU:
        increment the RETX_COUNT.
    if RETX_COUNT=maxRetxThreshold:
        indicate to upper layers that max retransmission has been reached.
When retransmitting an RLC SDU or an RLC SDU segment, the transmitting side of an AM RLC entity shall:
    if needed, segment the RLC SDU or the RLC SDU segment;
    form a new AMD PDU which will fit within the total size of AMD PDU(s) indicated by lower layer at the particular transmission opportunity;
    submit the new AMD PDU to lower layer.
When forming a new AMD PDU, the transmitting side of an AM RLC entity shall:
    only map the original RLC SDU or RLC SDU segment to the Data field of the new AMD PDU;
    modify the header of the new AMD PDU in accordance with the description in sub clause 6.2.2.4;
    set the P field according to sub clause 5.3.3.
[ . . . ]
5.3.4 Status Reporting
An AM RLC entity sends STATUS PDUs to its peer AM RLC entity in order to provide positive and/or negative acknowledgements of RLC SDUs (or portions of them).
Triggers to initiate STATUS reporting include:
    Polling from its peer AM RLC entity:
        When an AMD PDU with SN=x and the P field set to "1" is received from lower layer, the receiving side of an AM RLC entity shall:
            if the AMD PDU is to be discarded as specified in subclause 5.2.3.2.2; or if x<RX_Highest_Status or x>=RX_Next+AM_Window_Size:
  trigger a STATUS report.
else:
  delay triggering the STATUS report until x<RX_Highest_Status or x>=RX_Next+AM_Window_Size.
NOTE 1: This ensures that the RLC Status report is transmitted after HARQ reordering.
Detection of reception failure of an AMD PDU
  The receiving side of an AM RLC entity shall trigger a STATUS report when t-Reassembly expires.
NOTE 2: The expiry of t-Reassembly triggers both RX_Highest_Status to be updated and a STATUS report to be triggered, but the STATUS report shall be triggered after RX_Highest_Status is updated.
When STATUS reporting has been triggered, the receiving side of an AM RLC entity shall:
  if t-StatusProhibit is not running:
    at the first transmission opportunity indicated by lower layer, construct a STATUS PDU and submit it to lower layer.
  else:
    at the first transmission opportunity indicated by lower layer after t-StatusProhibit expires, construct a single STATUS PDU even if status reporting was triggered several times while t-StatusProhibit was running and submit it to lower layer.
When a STATUS PDU has been submitted to lower layer, the receiving side of an AM RLC entity shall:
  start t-StatusProhibit.
When constructing a STATUS PDU, the AM RLC entity shall:
  for the RLC SDUs with SN such that RX_Next<=SN<RX_Highest_Status that has not been completely received yet, in increasing SN order of RLC SDUs and increasing byte segment order within RLC SDUs, starting with SN=RX_Next up to the point where the resulting STATUS PDU still fits to the total size of RLC PDU(s) indicated by lower layer:
    for an RLC SDU for which no byte segments have been received yet:
      include in the STATUS PDU a NACK_SN which is set to the SN of the RLC SDU.
    for a continuous sequence of byte segments of a partly received RLC SDU that have not been received yet:
      include in the STATUS PDU a set of NACK_SN, SOstart and SOend.
    for a continuous sequence of RLC SDUs that have not been received yet:
      include in the STATUS PDU a set of NACK_SN and NACK range;
      include in the STATUS PDU, if required, a pair of SOstart and SOend.
  set the ACK_SN to the SN of the next not received RLC SDU which is not indicated as missing in the resulting STATUS PDU.
[ . . . ]
6.1.3 RLC Control PDU
a) STATUS PDU
STATUS PDU is used by the receiving side of an AM RLC entity to inform the peer AM RLC entity about RLC data PDUs that are received successfully, and RLC data PDUs that are detected to be lost by the receiving side of an AM RLC entity.

Figure 11:
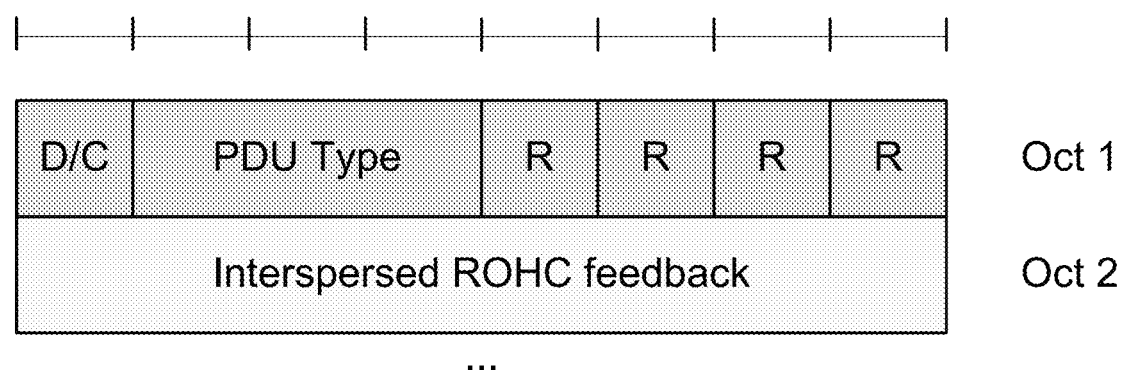
FIG. 11 is a reproduction of Figure 6.2.3.2-1 of 3GPP TS 38.323 V15.2.0.

3GPP TS 38.323 introduces PDCP control PDU for RoHC feedback as follows:
5.7.6 PDCP Control PDU for Interspersed ROHC Feedback
5.7.6.1 Transmit Operation
When an interspersed ROHC feedback is generated by the header compression protocol, the transmitting PDCP entity shall:
  submit to lower layers the corresponding PDCP Control PDU as specified in subclause 6.2.3.2 i.e. without associating a PDCP SN, nor performing ciphering.
5.7.6.2 Receive Operation
At reception of a PDCP Control PDU for interspersed ROHC feedback from lower layers, the receiving PDCP entity shall:
  deliver the corresponding interspersed ROHC feedback to the header compression protocol without performing deciphering.
[ . . . ]
6.2.3 Control PDU
[ . . . ]
6.2.3.2 Control PDU for Interspersed ROHC Feedback
Figure 6.2.3.2-1 shows the format of the PDCP Control PDU carrying one interspersed ROHC feedback. This format is applicable for UM DRBs and AM DRBs.
  [Figure 6.2.3.2-1 of 3GPP TS 38.323 V15.2.0, entitled "PDCP Control PDU format for interspersed ROHC feedback", is reproduced as FIG. 11]

3GPP TS 23.287 specifies a layer-2 link establishment procedure for unicast mode of V2X communication over PC5 reference point in Section 6.3.3.1. For example, the initiating UE (e.g. UE1) transmits a Direct Communication Request message and receives a Direct Communication Accept message from one or more peer UEs (e.g. UE2). According to Section 5.6.1.4 in 3GPP TS 23.287, the initial signalling for the establishment of the PC5 unicast link may use a default destination Layer-2 ID for initial signalling to establish a unicast link for a V2X service or a V2X application which offers the V2X service (e.g. PSIDs or ITS-AIDs).

In the Direct Communication Request message, UE2's application layer ID and UE1's application layer ID are included so that UE2 can determine whether to respond to the Direct Communication Request message. If UE2 determines to respond to the Direct Communication Request message, UE2 may initiate the procedure used to establish security context. For example, UE1 transmits a Direct Communication Request to UE2. In the Direct Communication Request, some parameters used to establish security context could be included. Upon reception of the Direct Communication Request, UE2 may initiate a Direct Auth and Key Establish procedure with UE1. And then, UE2 transmits a Direct Security Mode Command to UE1, and UE1 responds to UE2 with a Direct Security Mode Complete. In addition, if the Direct Security Mode Complete is received successfully, UE2 may transmit a Direct Communication Accept to UE1. In case security is not needed for the unicast link, the security configuration procedure can be omitted and UE2 may reply the Direct Communication Accept to UE1 directly.

When the Direct Communication Request message is transmitted, the source Layer-2 ID is set to Layer-2 ID of the initiating UE and the destination Layer-2 ID is set to the default destination Layer-2 ID associated with the service type (e.g. the V2X service or the V2X application). Therefore, UE2 may start to exchange signalling in the security establishment procedure based on the L2ID of UE1 and a L2ID of UE2.

According to 3GPP TR 38.885 and the 3GPP email discussion [108#44][V2X] 38.331 running CR (Huawei), a UE in RRC_CONNECTED will need to send a Sidelink UE Information message (e.g. SidelinkUEInformationNR) to gNB to request sidelink resources for transmitting sidelink traffic after a layer-2 link (or unicast link) has been established. gNB will then provide a dedicated sidelink configuration information (e.g. IE SL-ConfigDedicatedNR) for NR sidelink communication to the UE.

As specified in the 3GPP email discussion [108#44][V2X] 38.331 running CR (Huawei), SidelinkUEInformationNR may include the following information elements (IEs) related to the unicast link: sl-DestinationIdentity, sl-CastType, sl-RLC_ModeIndication, sl-QoS-InfoList, sl-Failure, sl-TypeTxSyncList, and sl-TxInterestedFreqList. And, sl-QoS-InfoList contains a list of sl-QoS-Info, which is specified in TS 23.287 to include the QoS profile of a sidelink QoS flow, and each sl-QoS-Info includes sl-QoS-FlowIdentity and sl-QoS-Profile. In response to reception of the SidelinkUEInformationNR, gNB may reply with a RRC Connection Reconfiguration message (e.g. RRCReconfiguration) to configure the dedicated sidelink configuration for the concerned sidelink QoS flow(s) identified by sl-QoS-FlowIdentity. For example, RRCReconfiguration may include IE SL-ConfigDedicatedNR, which may contain information to indicate the dedicated sidelink configuration. It may also contain information to indicate to which SLRB (or SL LCH) a sidelink QoS flow is mapped (e.g. sl-MappedQoS-Flows). The sidelink QoS flow may be mapped to an existing SLRB or a new SLRB. In case a new SLRB is needed, a SLRB configuration (e.g. sl-RadioBearerToAddModList) and/or a logical channel configuration (e.g. sl-RLC-BearerToAddModList) will be included for the new SLRB. It is noted that each SLRB is associated with a SL LCH.

As agreed in the RAN2#106 meeting (as discussed 3GPP R2-1908107), for SL unicast, the initiating UE informs the peer UE of SLRB parameters that are related to both TX and RX and need to be aligned with the peer UE. For example, the initiating UE may transmit a RRCReconfigurationSidelink message to inform the peer UE (as discussed in the 3GPP email discussion [108#44][V2X] 38.331 running CR (Huawei)), wherein slrb-PC5-ConfigIndex is included in the RRCReconfigurationSidelink to indicate the SLRB configuration for a SLRB to be established in the peer UE. In response, the peer UE may replies with a RRCReconfigurationCompleteSidelink message.

In addition, according to RAN2#108 agreement (as discussed in 3GPP R2-1916288), the peer UE shall report at least RLC mode indicated by the initiating UE to its gNB when the peer UE in RRC_CONNECTED receives an SLRB configuration with RLC AM/UM from the initiating UE and if the LCH has not been configured in the peer UE. It was also agreed that sidelink QoS profile is optional to be reported. The previous agreements were captured in the 3GPP email discussion [108#44][V2X] 38.331 running CR (Huawei), where the IE sl-QoS-InfoList defined in the SidelinkUEInformationNR message is specified as OPTIONAL. If sl-QoS-InfoList is present, it means the peer UE has data available for transmission from the sidelink QoS flow identified by sl-QoS-FlowIdentity in sl-QoS-InfoList. Otherwise (i.e. sl-QoS-InfoList is absent), it means the peer UE has no data available for transmission from the sidelink QoS flow identified by sl-QoS-FlowIdentity in sl-QoS-InfoList. The latter case implies that the peer UE only has RLC Control PDU (for RLC AM mode) or PDCP Control PDU (for ROHC feedback) and thus there is no need include sl-QoS-InfoList. After receiving the SidelinkUEInformationNR message, gNB may then allocate a proper dedicated sidelink configuration to the peer UE according to whether sl-QoS-InfoList is present.

Since the initiating UE may transmit a RRCReconfigurationSidelink message to inform the peer UE (as discussed in the 3GPP email discussion [108#44][V2X] 38.331 running CR (Huawei)) to establish multiple SLRBs, the peer UE needs to know which SLRB (or SL LCH) should be associated with the dedicated configuration information provided in the RRCReconfiguration by its gNB for the case where the peer UE has no data available for transmission from the concerned sidelink QoS flow mapped to the SLRB. If the peer UE follows the RRC running CR (as discussed in the 3GPP email discussion [108#44][V2X] 38.331 running CR (Huawei)), the peer UE would not include sl-QoS-Info in sl-QoS-InfoList of the SidelinkUEInformationNR in case the peer UE has no traffic for transmission from a concerned sidelink QoS flow. In this way, gNB cannot include sl-MappedQoS-Flows in SL-RadioBearerConfig of the RRCReconfiguration since the SidelinkUEInformationNR does not include the sl-QoS-FlowIdentity. In this situation, the peer UE does not know how to associate a SLRB (or a SL LCH) configured by the RRCReconfiguration with a SLRB (or a SL LCH) configured by the RRCReconfigurationSidelink.

For example, the RRCReconfigurationSidelink includes a first identity of a first sidelink QoS flow that is mapped to a first SL LCH using RLC AM for transmitting sidelink packets from the UE to the peer UE and a second identity of a second sidelink QoS flow that is mapped to a second SL LCH using RLC UM for transmitting sidelink packets from the UE to the peer UE. Since the peer UE currently has no traffic for transmission on the first or second SL LCHs, the peer UE still transmit SidelinkUEInformationNR to gNB but the SidelinkUEInformationNR does not report any sidelink QoS profile and/or sidelink QoS flow identity of the first/second sidelink QoS flows. Upon reception of this SidelinkUEInformationNR, gNB may transmit RRCReconfiguration including a first dedicated configuration information corresponding to the first SLRB or SL LCH and a second dedicated configuration information corresponding to the second SLRB or SL LCH to the peer UE. But, the peer UE is not able to associate which dedicated configuration information with which SLRB or SL LCH because the (first or second) dedicated configuration information includes neither the first identity of the first sidelink QoS flow nor the second identity of the second sidelink QoS flow. To address this issue, some solutions could be considered.

One potential solution is for the peer UE to include information related to the concerned SLRB (or SL LCH) in the SidelinkUEInformationNR so that its gNB can repeat the information in the RRCReconfiguration for the peer UE to know which SLRB (or SL LCH) should be associated with the dedicated configuration information. Possibly, the information related to the concerned SLRB (or SL LCH) could be derived from RRCReconfigurationSidelink. For example, the peer UE may include a slrb-PC5-ConfigIndex in the SidelinkUEInformationNR and then the gNB can provide a dedicated sidelink configuration for the slrb-PC5-ConfigIndex via the RRCReconfiguration. For another example, the peer UE may include a sl-LogicalChannelIdentity in the SidelinkUEInformationNR and then the gNB can provide a dedicated sidelink configuration for the sl-LogicalChannelIdentity via the RRCReconfiguration. The slrb-PC5-ConfigIndex or the sl-LogicalChannelIdentity is originally included in the RRCReconfigurationSidelink and is used to identify a SLRB (or SL LCH) configured for transmitting sidelink packets from the UE to the peer UE. In this way, the peer UE can know which SLRB (or SL LCH) should be associated with the dedicated sidelink configuration (e.g. IE SL-ConfigDedicatedNR) provided by its gNB.

Alternatively, the peer UE may include sl-QoS-FlowIdentity in sl-QoS-InfoList and does not include sl-QoS-Profile in sl-QoS-InfoList when transmitting the SidelinkUEInformationNR message to its gNB and then the gNB can provide a dedicated sidelink configuration for the sidelink QoS flow. In this way, the peer UE can also know which SLRB (or SL LCH) should be associated with the dedicated sidelink configuration (e.g. IE SL-ConfigDedicatedNR) provided by its gNB because the sidelink QoS flow is mapped to the concerned SLRB (or SL LCH). This alternative may induce less change to the current RRC running CR (as discussed in the 3GPP email discussion [108#44][V2X] 38.331 running CR (Huawei)) as compared with the previous solution.

For example, the peer UE may receive the RRCReconfigurationSidelink from the UE. In the RRCReconfigurationSidelink, an identity of a sidelink QoS flow is mapped to a SLRB (or a SL LCH) for transmitting sidelink packets from the UE to the peer UE. Then, the peer UE may transmit the SidelinkUEInformationNR to gNB. In the SidelinkUEInformationNR, the identity of the sidelink QoS flow is reported. After transmission of the SidelinkUEInformationNR, the peer UE receives the RRCReconfiguration from gNB. In the RRCReconfiguration, a dedicated configuration information for configuring a SLRB (or a SL LCH) for transmitting sidelink packets from the peer UE to the UE is included. In the dedicated configuration information, the identity of the sidelink QoS flow is included so that the peer UE knows the SLRB (or the SL LCH) configured by the dedicated configuration information should be associated with the SLRB (or the SL LCH) configured by the RRCReconfigurationSidelink.

Alternatively, each dedicated configuration information without including sl-MappedQoS-Flows could be orderly associated with one SL-TxResourceReq without including SL-QoS-Info in SidelinkUEInformationNR message. Basically, since the peer UE constructs a list of SL-TxResourceReq in the SidelinkUEInformationNR message by itself, the peer UE should know a SL-TxResourceReq not including SL-QoS-Info is associated with which one SLRB (or SL LCH) configured by RRCReconfigurationSidelink. Therefore, the peer UE can know a dedicated configuration information without including sl-MappedQoS-Flows is associated with one SLRB (or SL LCH) for which no SL-QoS-Info is reported for this SLRB (or SL LCH).

For example, the UE may establish three SLRBs (or SL LCHs) for transmitting sidelink packets from the UE to the peer UE, one is a first SLRB using RLC AM, another is a second SLRB using RLC UM and the other is a third SLRB using RLC AM. The first SLRB is mapped to a sidelink QoS flow ID 1. The second SLRB is mapped to a sidelink QoS flow ID 2&3. The third SLRB is mapped to a sidelink QoS flow ID 4&5. The UE may transmit a RRCReconfigurationSidelink message to the peer UE, wherein the RRCReconfigurationSidelink message includes IEs for configuring these three SLRBs as shown in Table 1 below.

TABLE 1 of RRCReconfigurationSidelink

| SLRB (or SL LCH) # | SLRB-PC5-ConfigIndex | sl-MappedQoS-FlowsToAddList included in SL-SDAP-Config | SL-RLC-Config |
|---|---|---|---|
| SLRB 1 | 1 | PFI 1 | sl-AM-RLC |
| SLRB 2 | 2 | PFI 2,3 | sl-UM-RLC |
| SLRB 3 | 3 | PFI 4,5 | sl-AM-RLC |

Upon reception of the RRCReconfigurationSidelink message, the peer UE transmits a SidelinkUEInformationNR message to gNB. At this moment, the peer UE may have traffic for transmission only on the sidelink QoS flows associated with PFI 2&3. Therefore, the peer UE only reports PFI 2&3 in the SidelinkUEInformationNR message. The PFI 2&3 could be reported via sl-UM-QoS-InfoList or sl-QoS-InfoList. There are two examples to report the PFI 2&3 in Table 2-1 and Table 2-2 separately.

TABLE 2-1 of SidelinkUEInformationNR Example 1

| SL-TxResourceReq # | sl-RLC-ModeIndication | sl-UM-QoS-InfoList included in sl-RLC-ModeIndication | sl-QoS-InfoList |
|---|---|---|---|
| 1 | sl-AM-Mode | Not present | Not present |
| 2 | sl-UM-Mode | PFI 2, 3 | Not present |
| 3 | sl-AM-Mode | Not present | Not present |

TABLE 2-2 of SidelinkUEInformationNR Example 2

| SL-TxResourceReq # | sl-RLC-ModeIndication | sl-UM-QoS-InfoList included in sl-RLC-ModeIndication | sl-QoS-InfoList |
|---|---|---|---|
| 1 | sl-AM-Mode | Not present | Not present |
| 2 | sl-UM-Mode | Not present | PFI 2, 3 |
| 3 | sl-AM-Mode | Not present | Not present |

Upon reception of the SidelinkUEInformationNR message, gNB responds a RRCReconfiguration message to the peer UE. gNB may include IEs in the RRCReconfiguration message in different ways. In the RRCReconfiguration message, a first dedicated configuration information (SL-RadioBearerConfig #1 and SL-RLC-BearerConfig #1), a second dedicated configuration information (SL-RadioBearerConfig #2 and SL-RLC-BearerConfig #2) and a third dedicated configuration information (SL-RadioBearerConfig #3 and SL-RLC-BearerConfig #3) are included. The peer UE could associate the dedicated configuration information including PFIs 2&3 with SLRB2 because both a SL-QoS-FlowIdentity of sl-MappedQoS-Flows and a sl-QoS-FlowIdentity are mapped to SLRB2 (i.e. the SL-QoS-FlowIdentity in the sl-MappedQoS-Flows is the same as the sl-QoS-FlowIdentity).

One example could be illustrated in Table 3-1. With this RRCReconfiguration message, the peer UE associates the first dedicated configuration information with SLRB1 and associates the third dedicated configuration information with SLRB3.

TABLE 3-1 of RRCReconfiguration Example 1

| SL-RadioBearerConfig # | sl-MappedQoS-Flows in sl-SDAP-Config of the SL-RadioBearerConfig | SL-RLC-BearerConfig # | SL-RLC-Config in the SL-RLC-BearerConfig | MaxRetxThreshold in the SL-RLC-BearerConfig |
|---|---|---|---|---|
| 1 | Not present | 1 | sl-AM-RLC | t1 |
| 2 | PFI 2, 3 | 2 | sl-UM-RLC | N/A |
| 3 | Not present | 3 | sl-AM-RLC | t3 |

Another example could be illustrated in Table 3-2. With this RRCReconfiguration message, the peer UE associates the second dedicated configuration information with SLRB1 and associates the third dedicated configuration information with SLRB3.

TABLE 3-2 of RRCReconfiguration Example 2

| SL-RadioBearerConfig # | sl-MappedQoS-Flows in sl-SDAP-Config of the SL-RadioBearerConfig | SL-RLC-BearerConfig # | SL-RLC-Config in the SL-RLC-BearerConfig | MaxRetxThreshold in the SL-RLC-BearerConfig |
|---|---|---|---|---|
| 1 | PFI 2, 3 | 1 | sl-UM-RLC | N/A |
| 2 | Not present | 2 | sl-AM-RLC | t1 |
| 3 | Not present | 3 | sl-AM-RLC | t3 |

Another example could be illustrated in Table 3-3. With this RRCReconfiguration message, the peer UE associates the first dedicated configuration information with SLRB1 and associates the second dedicated configuration information with SLRB3.

TABLE 3-3 of RRCReconfiguration Example 3

| SL-RadioBearerConfig # | sl-MappedQoS-Flows in sl-SDAP-Config of the SL-RadioBearerConfig | SL-RLC-BearerConfig # | SL-RLC-Config in the SL-RLC-BearerConfig | MaxRetxThreshold in the SL-RLC-BearerConfig |
|---|---|---|---|---|
| 1 | Not present | 1 | sl-AM-RLC | t1 |
| 2 | Not present | 2 | sl-AM-RLC | t3 |
| 3 | PFI 2, 3 | 3 | sl-UM-RLC | N/A |

Figure 12:
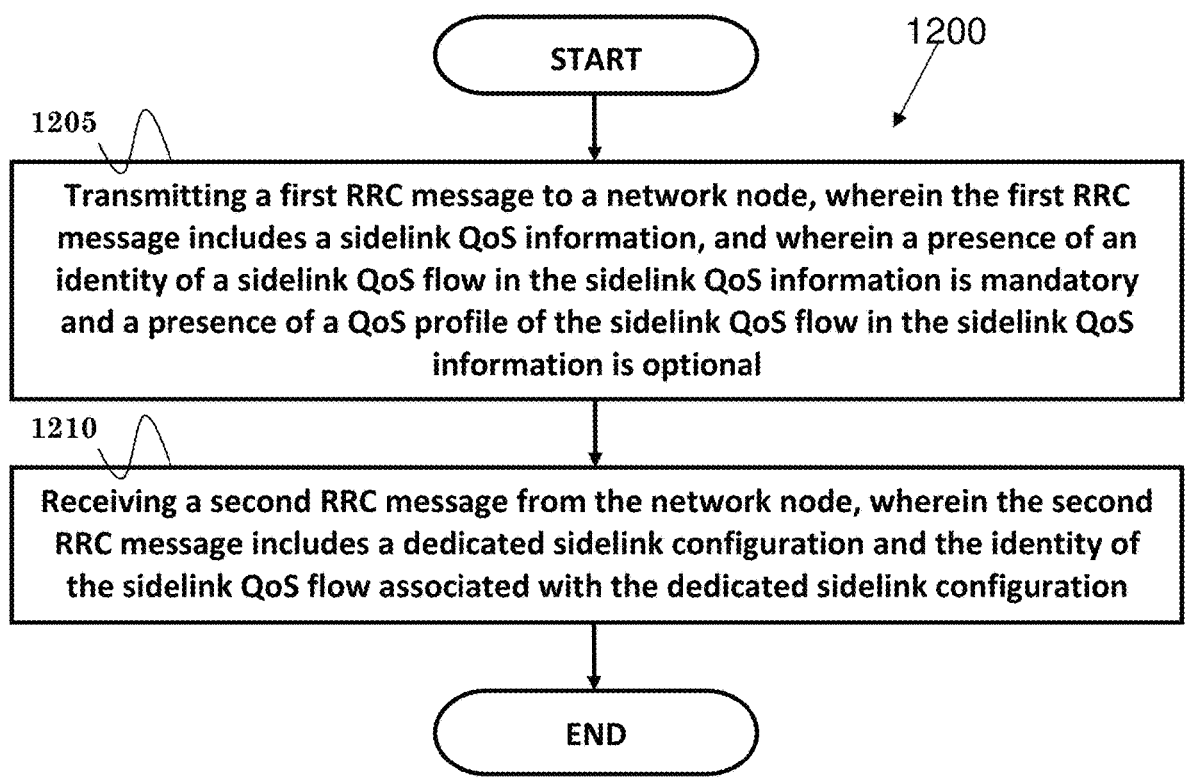
FIG. 12 is a flow chart according to one exemplary embodiment.

FIG. 12 is a flow chart 1200 according to one exemplary embodiment from the perspective of a first UE to request dedicated sidelink configuration. In step 1205, the first UE transmits a first RRC message to a network node, wherein the first RRC message includes a sidelink QoS information, and wherein a presence of an identity of a sidelink QoS flow in the sidelink QoS information is mandatory and a presence of a QoS profile of the sidelink QoS flow in the sidelink QoS information is optional. In step 1210, the first UE receives a second RRC message from the network node, wherein the second RRC message includes a dedicated sidelink configuration and the identity of the sidelink QoS flow associated with the dedicated sidelink configuration.

In one embodiment, the sidelink QoS information may include the identity of the sidelink QoS flow, and may not include any QoS profile of the sidelink QoS flow if there is no data available for transmission from the sidelink QoS flow. Furthermore, the sidelink QoS information may include the identity of the sidelink QoS flow, and may also include the QoS profile of the sidelink QoS flow if there is data available for transmission from the sidelink QoS flow.

In one embodiment, the first UE may receive a first sidelink RRC message from a second UE before transmitting the first RRC message to the network node. The first sidelink RRC message may include a SLRB configuration for reception, an index to the SLRB configuration (e.g. slrb-PC5-ConfigIndex), and/or a logical channel configuration. The first sidelink RRC message could be a RRCReconfigurationSidelink message. Furthermore, the first UE may associate a counter SLRB configured by the dedicated sidelink configuration with a SLRB configured by the first sidelink RRC message according to the identity of the sidelink QoS flow. The SLRB may be used for transmitting packets from the second UE to the first UE, and the counter SLRB is used for transmitting packets from the first UE to the second UE.

In one embodiment, the first RRC message could be a SidelinkUEInformationNR message, and the second RRC message could be a RRCReconfiguration message.

In one embodiment, the network node could be a base station (e.g. gNB).

Referring back to FIGS. 3 and 4, in one exemplary embodiment of a first UE to request dedicated sidelink configuration. The first UE 300 includes a program code 312 stored in the memory 310. The CPU 308 could execute program code 312 to enable the first UE (i) to transmit a first RRC message to a network node, wherein the first RRC message includes a sidelink QoS information, and wherein a presence of an identity of a sidelink QoS flow in the sidelink QoS information is mandatory and a presence of a QoS profile of the sidelink QoS flow in the sidelink QoS information is optional, and (ii) to receive a second RRC message from the network node, wherein the second RRC message includes a dedicated sidelink configuration and the identity of the sidelink QoS flow associated with the dedicated sidelink configuration. Furthermore, the CPU 308 can execute the program code 312 to perform all of the above-described actions and steps or others described herein.

Figure 13:
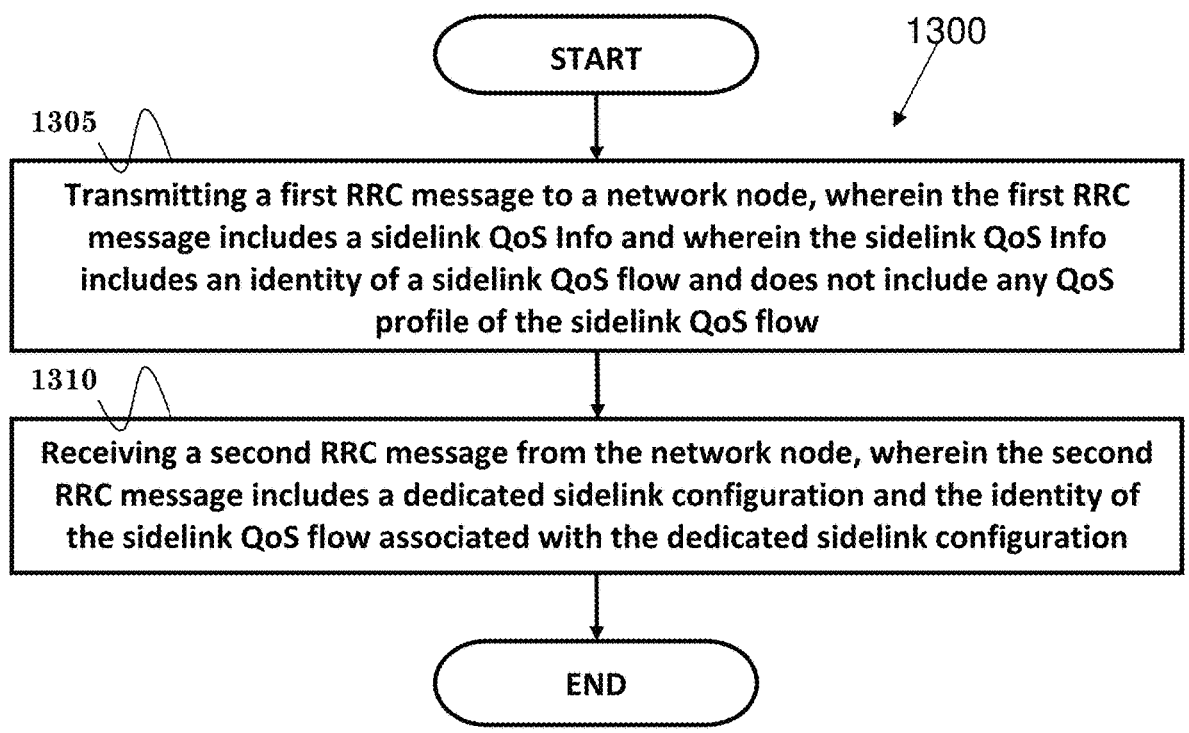
FIG. 13 is a flow chart according to one exemplary embodiment.

FIG. 13 is a flow chart 1300 according to one exemplary embodiment from the perspective of a first UE to request dedicated sidelink configuration. In step 1305, the first UE transmits a first RRC message to a network node, wherein the first RRC message includes a sidelink QoS Info and wherein the sidelink QoS Info includes an identity of a sidelink QoS flow and does not include any QoS profile of the sidelink QoS flow. In step 1310, the first UE receives a second RRC message from the network node, wherein the second RRC message includes a dedicated sidelink configuration and the identity of the sidelink QoS flow associated with the dedicated sidelink configuration.

In one embodiment, the sidelink QoS Info may include the identity of the sidelink QoS flow, and may not include any QoS profile of the sidelink QoS flow if there is no data available for transmission from the sidelink QoS flow. Furthermore, the sidelink QoS Info may include the identity of the sidelink QoS flow, and may also include a QoS profile of the sidelink QoS flow if there is data available for transmission from the sidelink QoS flow.

In one embodiment, the first RRC message may include a destination identity (e.g. Destination Layer-2 ID), a cast type, RLC Mode indication, and/or a frequency. The second RRC message may include a resource allocation mode, a SLRB configuration for transmission, and/or a logical channel configuration.

In one embodiment, the first UE could receive a first sidelink RRC message from a second UE before transmitting the first RRC message. Furthermore, the first UE could transmit the first RRC message in response to reception of the first sidelink RRC message from the second UE. The first sidelink RRC message may include a SLRB configuration for reception, an index to the SLRB configuration (e.g. slrb-PC5-ConfigIndex), and/or a logical channel configuration. In addition, the first UE could reply with a second sidelink RRC message to the second UE.

In one embodiment, the first RRC message may be a SidelinkUEInformationNR message. The second RRC message may be a RRCReconfiguration message. The first sidelink RRC message may be a RRCReconfigurationSidelink message. The second sidelink RRC message may be a RRCReconfigurationCompleteSidelink message.

In one embodiment, the network node could be a base station (e.g. gNB).

Referring back to FIGS. 3 and 4, in one exemplary embodiment of a first UE to request dedicated sidelink resources. The first UE 300 includes a program code 312 stored in the memory 310. The CPU 308 could execute program code 312 to enable the first UE (i) to transmit a first RRC message to a network node, wherein the first RRC message includes a sidelink QoS Info and wherein the sidelink QoS Info includes an identity of a sidelink QoS flow and does not include any QoS profile of the sidelink QoS flow, and (ii) to receive a second RRC message from the network node, wherein the second RRC message includes a dedicated sidelink configuration and the identity of the sidelink QoS flow associated with the dedicated sidelink configuration. Furthermore, the CPU 308 can execute the program code 312 to perform all of the above-described actions and steps or others described herein.

Figure 14:
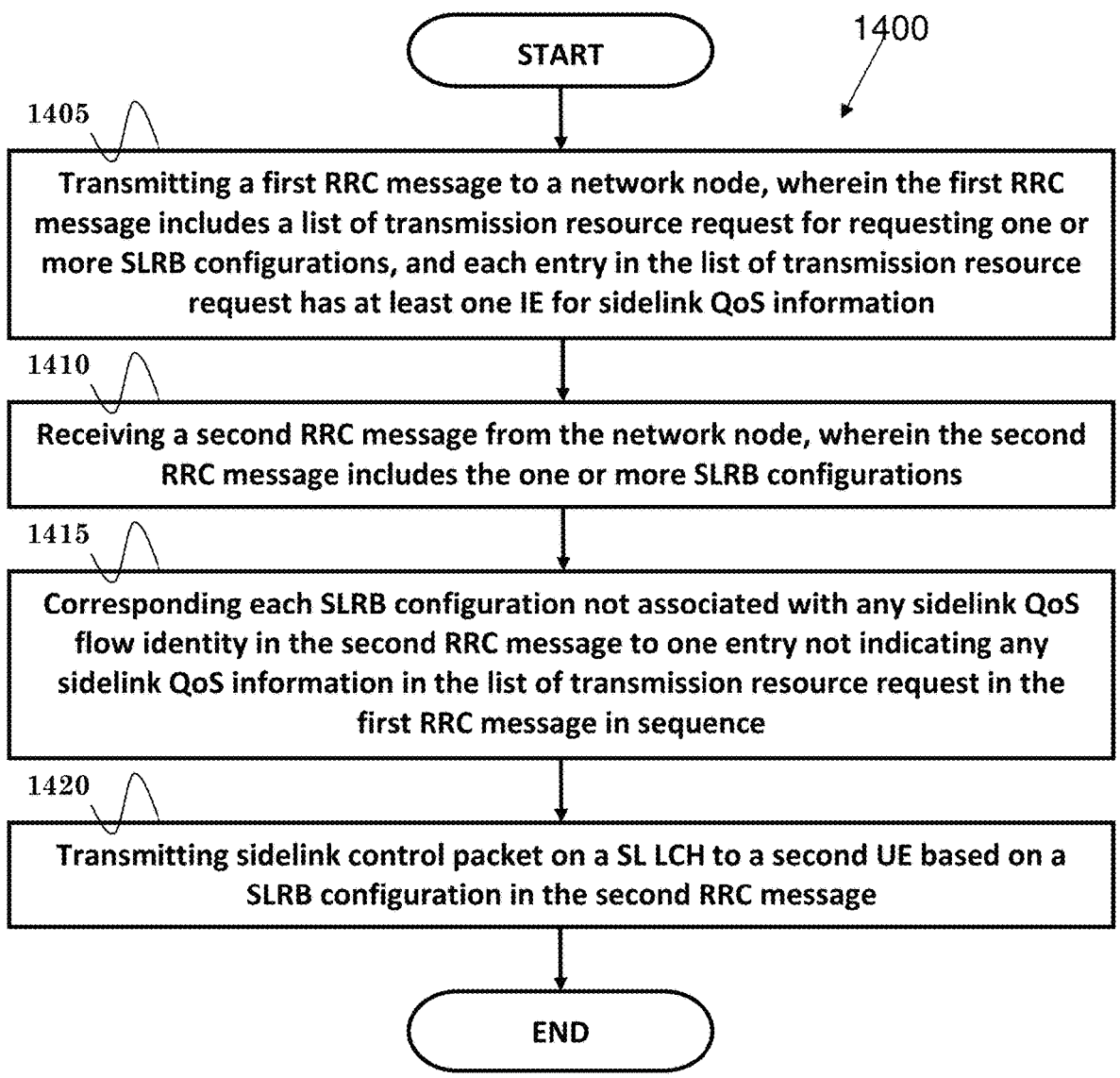
FIG. 14 is a flow chart according to one exemplary embodiment.

FIG. 14 is a flow chart 1400 according to one exemplary embodiment from the perspective of a first UE to request Sidelink Radio Bearer (SLRB) configuration. In step 1405, the first UE transmits a first RRC message to a network node, wherein the first RRC message includes a list of transmission resource request for requesting one or more SLRB configurations, and each entry in the list of transmission resource request has at least one IE for sidelink QoS information. In step 1410, the first UE receives a second RRC message from the network node, wherein the second RRC message includes the one or more SLRB configurations. In step 1415, the first UE corresponds each SLRB configuration not associated with any sidelink QoS flow identity in the second RRC message to one entry not indicating any sidelink QoS information in the list of transmission resource request in the first RRC message in sequence. In step 1420, the first UE transmits sidelink control packet on a SL LCH to a second UE based on a SLRB configuration in the second RRC message.

In one embodiment, each entry in the list of transmission resource request also has one IE for RLC mode indication.

In one embodiment, the first UE could receive a PC5 RRC message from the second UE, wherein the PC5 RRC message indicates establishment of a first SLRB (or a first SL LCH) using a first LCID and a RLC mode, and the first SLRB is mapped to a first sidelink QoS flow associated with a first PFI and/or a first sidelink QoS profile. The PC5 RRC message may also indicate establishment of a second SLRB (or a second SL LCH) using a second LCID and a RLC mode, and the second SLRB is mapped to a second sidelink QoS flow associated with a second PFI and/or a second sidelink QoS profile.

In one embodiment, a first entry of the list of transmission resource request may indicate the RLC mode of the first SLRB, but may not include the first PFI and/or the first sidelink QoS profile. Furthermore, a second entry of the list of transmission resource request may indicate the RLC mode of the second SLRB, but may not include the second PFI and/or the second sidelink QoS profile. The second RRC message may include a first SLRB configuration not associated with any PFI and a second SLRB configuration not associated with any PFI in-sequence.

In one embodiment, a first entry may be the very first entry in the list of transmission resource request that may indicate one RLC mode of one SLRB, but may not include any PFI and/or any sidelink QoS profile. The second entry may be an entry following the very first entry in the list of transmission resource request that may indicate one RLC mode of one SLRB, but may not include any PFI and/or any sidelink QoS profile.

In one embodiment, the first SLRB configuration could be the very first SLRB configuration in the second RRC message that may indicate any PFI associated with this SLRB configuration. The second SLRB configuration could be a SLRB configuration following the very first SLRB configuration in the second RRC message that may not indicate any PFI associated with this SLRB configuration.

In one embodiment, the first UE could transmit one or more sidelink control packets on one SL LCH associated with the first LCID based on the first SLRB configuration. The first UE could also transmit one or more sidelink control packets on one SL LCH associated with the second LCID based on the second SLRB configuration.

In one embodiment, the first RRC message may be a SidelinkUEInformationNR message. The second RRC message may be a RRCReconfiguration message. The PC5 RRC message may be a RRCReconfigurationSidelink message.

In one embodiment, the sidelink control packet may be a RLC status report or a RoHC feedback. The sidelink QoS information may include a sidelink or PC5 QoS flow identity (PFI) and/or a sidelink QoS profile for a sidelink QoS flow.

In one embodiment, the network node could be a base station (e.g. gNB).

Referring back to FIGS. 3 and 4, in one exemplary embodiment of a first UE to request SLRB configuration. The first UE 300 includes a program code 312 stored in the memory 310. The CPU 308 could execute program code 312 to enable the first UE (i) to transmit a first RRC message to a network node, wherein the first RRC message includes a list of transmission resource request for requesting one or more SLRB configurations, and each entry in the list of transmission resource request has at least one IE for sidelink QoS information, (ii) to receive a second RRC message from the network node, wherein the second RRC message includes the one or more SLRB configurations, (iii) to correspond each SLRB configuration not associated with any sidelink QoS flow identity in the second RRC message to one entry not indicating any sidelink QoS information in the list of transmission resource request in the first RRC message in sequence, and (iv) to transmit sidelink control packet on a SL LCH to a second UE based on a SLRB configuration in the second RRC message. Furthermore, the CPU 308 can execute the program code 312 to perform all of the above-described actions and steps or others described herein.

Figure 15:
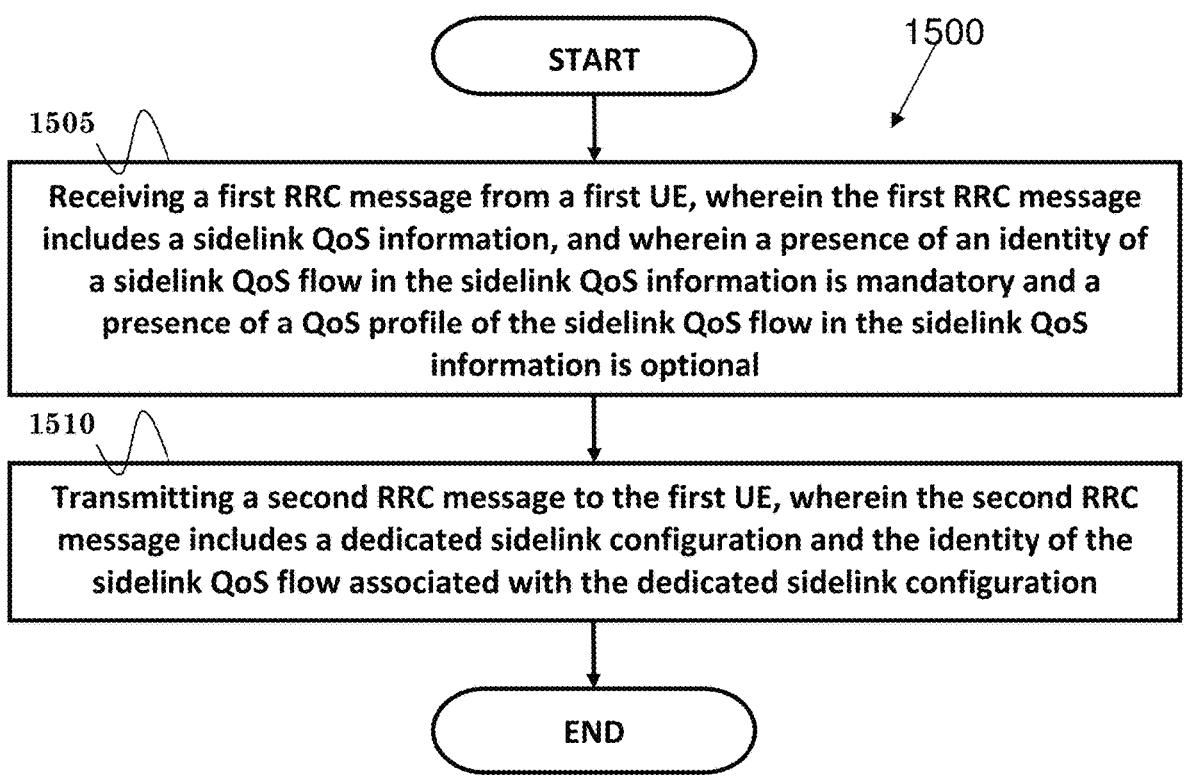
FIG. 15 is a flow chart according to one exemplary embodiment.

FIG. 15 is a flow chart 1500 according to one exemplary embodiment from the perspective of a network node to assign dedicated sidelink configuration. In step 1505, the network node receives a first RRC message from a first UE, wherein the first RRC message includes a sidelink QoS information, and wherein a presence of an identity of a sidelink QoS flow in the sidelink QoS information is mandatory and a presence of a QoS profile of the sidelink QoS flow in the sidelink QoS information is optional. In step 1510, the network node transmits a second RRC message to the first UE, wherein the second RRC message includes a dedicated sidelink configuration and the identity of the sidelink QoS flow associated with the dedicated sidelink configuration.

In one embodiment, the sidelink QoS information may include the identity of the sidelink QoS flow, and may not include any QoS profile of the sidelink QoS flow if there is no data available in the first UE for transmission from the sidelink QoS flow. Alternatively, the sidelink QoS information may include the identity of the sidelink QoS flow, and may also include the QoS profile of the sidelink QoS flow if there is data available in the first UE for transmission from the sidelink QoS flow.

In one embodiment, the first RRC message may be a SidelinkUEInformationNR message, and the second RRC message is a RRCReconfiguration message.

In one embodiment, the network node could be a base station (e.g. gNB).

Referring back to FIGS. 3 and 4, in one exemplary embodiment of a first UE to request SLRB configuration the perspective of a network node to assign dedicated sidelink configuration. The network node 300 includes a program code 312 stored in the memory 310. The CPU 308 could execute program code 312 to enable the network node (i) to receive a first RRC message from a first UE, wherein the first RRC message includes a sidelink QoS information, and wherein a presence of an identity of a sidelink QoS flow in the sidelink QoS information is mandatory and a presence of a QoS profile of the sidelink QoS flow in the sidelink QoS information is optional, and (ii) to transmit a second RRC message to the first UE, wherein the second RRC message includes a dedicated sidelink configuration and the identity of the sidelink QoS flow associated with the dedicated sidelink configuration. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) to request dedicated sidelink configuration, comprising:
   receiving a first sidelink Radio Resource Control (RRC) message from a second UE;
   transmitting, in response to receiving the first sidelink RRC message from the second UE, a first RRC message to a network node, wherein the first RRC message includes a sidelink Quality of Service (QoS) information, and wherein a presence of an identity of a sidelink QoS flow in the sidelink QoS information is mandatory and a presence of a QoS profile of the sidelink QoS flow in the sidelink QoS information is optional; and
   receiving a second RRC message from the network node, wherein the second RRC message includes a dedicated sidelink configuration and the identity of the sidelink QoS flow associated with the dedicated sidelink configuration.

2. The method of claim 1, wherein the sidelink QoS information includes the identity of the sidelink QoS flow, and does not include any QoS profile of the sidelink QoS flow if there is no data available for transmission from the sidelink QoS flow.

3. The method of claim 1, wherein the sidelink QoS information includes the identity of the sidelink QoS flow, and also includes the QoS profile of the sidelink QoS flow if there is data available for transmission from the sidelink QoS flow.

4. The method of claim 1, wherein the first sidelink RRC message includes a Sidelink Radio Bearer (SLRB) configuration for reception, an index to the SLRB configuration, and/or a logical channel configuration.

5. The method of claim 1, wherein the first sidelink RRC message is a RRCReconfigurationSidelink message.

6. The method of claim 1, further comprising:
   associating a counter SLRB configured by the dedicated sidelink configuration with a Sidelink Radio Bearer (SLRB) configured by the first sidelink RRC message according to the identity of the sidelink QoS flow.

7. The method of claim 6, wherein the SLRB is used for transmitting packets from the second UE to the first UE, and the counter SLRB is used for transmitting packets from the first UE to the second UE.

8. The method of claim 1, wherein the first RRC message is a SidelinkUEInformationNR message, and the second RRC message is a RRCReconfiguration message.

9. The method of claim 1, wherein the network node is a base station.

10. A first UE (User Equipment), comprising:
    a control circuit;
    a processor installed in the control circuit; and
    a memory installed in the control circuit and operatively coupled to the processor;
    wherein the processor is configured to execute a program code stored in the memory to:
       receive a first sidelink Radio Resource Control (RRC) message from a second UE;
       transmit, in response to receiving the first sidelink RRC message from the second UE, a first RRC message to a network node, wherein the first RRC message includes a sidelink Quality of Service (QoS) information, and wherein a presence of an identity of a sidelink QoS flow in the sidelink QoS information is mandatory and a presence of a QoS profile of the sidelink QoS flow in the sidelink QoS information is optional; and receive a second RRC message from the network node, wherein the second RRC message includes a dedicated sidelink configuration and the identity of the sidelink QoS flow associated with the dedicated sidelink configuration.

11. The first UE of claim 10, wherein the sidelink QoS information includes the identity of the sidelink QoS flow, and does not include any QoS profile of the sidelink QoS flow if there is no data available for transmission from the sidelink QoS flow.

12. The first UE of claim 10, wherein the sidelink QoS information includes the identity of the sidelink QoS flow, and also includes the QoS profile of the sidelink QoS flow if there is data available for transmission from the sidelink QoS flow.

13. The first UE of claim 10, wherein the first sidelink RRC message includes a Sidelink Radio Bearer (SLRB) configuration for reception, an index to the SLRB configuration, and/or a logical channel configuration.

14. A method for a network node to assign dedicated sidelink configuration, comprising:
receiving a first Radio Resource Control (RRC) message from a first UE (User Equipment), wherein the first RRC message includes a sidelink Quality of Service (QoS) information, and wherein a presence of an identity of a sidelink QoS flow in the sidelink QoS information is mandatory and a presence of a QoS profile of the sidelink QoS flow in the sidelink QoS information is optional, wherein the sidelink QoS information includes the QoS profile of the sidelink QoS flow if there is data available in the first UE for transmission from the sidelink QoS flow; and
transmitting a second RRC message to the first UE, wherein the second RRC message includes a dedicated sidelink configuration and the identity of the sidelink QoS flow associated with the dedicated sidelink configuration.

15. The method of claim 14, wherein the sidelink QoS information does not include any QoS profile of the sidelink QoS flow if there is no data available in the first UE for transmission from the sidelink QoS flow.

16. The method of claim 14, wherein the first RRC message is a SidelinkUEInformationNR message, and the second RRC message is a RRCReconfiguration message.

17. The method of claim 14, wherein the network node is a base station.

* * * * *